US009892140B2

(12) United States Patent
Koch

(10) Patent No.: US 9,892,140 B2
(45) Date of Patent: Feb. 13, 2018

(54) CREATING AND USING GROUPS FOR TASK COLLABORATION

(71) Applicant: AT&T Intellectual Property I, L.P., Atlanta, GA (US)

(72) Inventor: Robert Alan Koch, Norcross, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 189 days.

(21) Appl. No.: 14/501,921

(22) Filed: Sep. 30, 2014

(65) Prior Publication Data

US 2016/0094592 A1    Mar. 31, 2016

(51) Int. Cl.
G06F 15/16 (2006.01)
G06F 17/30 (2006.01)
H04L 29/08 (2006.01)

(52) U.S. Cl.
CPC ........ G06F 17/30312 (2013.01); H04L 67/12 (2013.01); H04L 67/16 (2013.01); H04L 67/2838 (2013.01)

(58) Field of Classification Search
CPC .......... G06F 3/01; G06F 9/4445; G06F 9/455; H04L 67/38; H04L 67/1095; H04L 67/36; H04L 63/08
USPC ....................................................... 709/204
See application file for complete search history.

(56) References Cited

U.S. PATENT DOCUMENTS

| 6,065,039 | A | 5/2000 | Paciorek |
| 8,027,861 | B2 | 9/2011 | Brintle |
| 8,639,552 | B1 | 1/2014 | Chen et al. |
| 2006/0183100 | A1 | 8/2006 | Voehl et al. |
| 2007/0168471 | A1 | 7/2007 | Childress et al. |
| 2008/0072334 | A1 | 3/2008 | Bailey et al. |
| 2008/0080529 | A1 | 4/2008 | Kaler |
| 2008/0183819 | A1* | 7/2008 | Gould .................... G06Q 10/10 709/205 |
| 2009/0319608 | A1 | 12/2009 | Anil et al. |
| 2011/0320961 | A1* | 12/2011 | Sriraghavan .......... G06F 9/4445 715/753 |
| 2013/0138461 | A1 | 5/2013 | Shahraray et al. |
| 2013/0173486 | A1 | 7/2013 | Peters et al. |
| 2014/0164469 | A1 | 6/2014 | Neill et al. |
| 2014/0372524 | A1* | 12/2014 | Der ........................ H04L 67/10 709/204 |
| 2015/0358810 | A1* | 12/2015 | Chao ..................... H04W 4/001 455/418 |

* cited by examiner

Primary Examiner — Tauqir Hussain
(74) Attorney, Agent, or Firm — Hartman & Citrin LLC

(57) ABSTRACT

Concepts and technologies are disclosed herein for creating and using groups for task collaboration. A computing device can include a processor. The computing device can detect an opportunity to initiate collaboration on a task by a group of devices that includes a collaborating device. The computing device can create the group of devices, provide collaboration data to the collaborating device, and obtain input generated by the collaborating device based upon the collaboration data. The computing device can terminate the group.

18 Claims, 17 Drawing Sheets

CREATING AND USING GROUPS FOR TASK COLLABORATION

BACKGROUND

Over the past several years, smartphones and other Internet-enabled devices have become useful for a variety of purposes beyond the original telephony and simple data transfer tasks for which these devices originally were designed. It is not uncommon to see a smartphone user checking prices at a grocery store, sending emails while waiting in line, watching videos while riding a train or bus, or otherwise engaging in advanced communication tasks using smartphones.

Notwithstanding the increasingly commonplace use of smartphones, there are some aspects of smartphones and/or smartphone data connectivity that may frustrate the adoption and/or use of some smartphone functionality by some users. For example, there may be a perception that smartphones can increase the risk of certain types of fraud, for example when transferring payment information and/or other personal information over electronic channels.

In an attempt to address some of these real and/or perceived vulnerabilities, various technologies have been developed for making secure payments using smartphones or other electronic devices. Some of these technologies, for example near field communication ("NFC"), can rely upon extremely short range wireless technologies to decrease the risk of interception of the information. Users who wish to pay using these technologies generally must bring an electronic device within 6-8 cm of a payment system, which may preclude interception of any wireless signals associated with the payment operation.

While multiple users of smartphones may sometimes be located in a single geographic location, there may be no way to recognize the colocation of these devices and/or to take advantage of that colocation. Furthermore, there are times at which verbal communication can be less accurate and/or less reliable than electronic communications. Thus, while there may be a risk in using smartphones or other devices to complete electronic transactions, the risks of completing these transactions via other approaches (e.g., verbal communication, swiping credit cards, or the like), may exceed the risks of using smartphones.

SUMMARY

The present disclosure is directed to creating and using groups for task collaboration. A "task" can include any operation or activity that can be replicated among multiple devices, divided among multiple devices, or the like. For example, multiple devices can be located at a restaurant. An order for two or more users associated with the devices can be considered a "task." Each of the devices can therefore complete part of the task by collecting an order from an associated user. Similarly, each user in a group may register for an event, submit information, obtain tickets, purchase products, or the like as part of a task. According to various embodiments of the concepts and technologies described herein, each user can complete an associated portion of the task and/or an instance of the task using his or her computing device (e.g., a smartphone, media device, laptop computer, or the like). It should be understood that these examples are illustrative and therefore should not be construed as being limiting in any way.

A requestor can be located at a particular location. The requestor can include a computing device that can execute one or more software modules, applications, or the like for creating and/or controlling groups for collaborating during completion of a task. In some embodiments, the requestor can execute a task collaboration application. One or more devices can enter a proximity of the requestor. The devices can include a user device, which can operate as a controller device in some embodiments. The devices also can execute a task collaboration application, in some embodiments. The requestor can generate a trigger and transmit the trigger to the user device. In some other embodiments, the user device can detect the requestor and/or visual, audio, or digital signals or indicia associated with the requestor and self-create the trigger. In response to the trigger, the user device can determine that an opportunity or application for a collaboration session exists, and discover collaboration-enabled devices in the proximity of the requestor or the user device.

The user device can send invitations to the devices and query the devices, via the invitations, to determine if the devices are collaboration-enabled and/or wish to participate in the collaboration session. The invitation can explicitly or implicitly request collaboration from the devices. The devices can respond via a response. The user device can create a group of devices that have selected to participate in the task collaboration and obtain collaboration data from the requestor. The user device also can provide the collaboration data to the one or more members of the group such as, for example, a collaborating device. In some embodiments, the user device can divide the collaboration data among the devices in the group, and in other embodiments the user device can send copies of the collaboration data to the devices in the group.

The user device and the one or more collaborating device can execute a portion of the task assigned to those devices or a device-specific iteration of the task. In some embodiments, the user device and/or the collaborating device can present one or more user interfaces for presenting and/or interacting with the collaboration data, and generate device task data (e.g., user device task data and/or collaborating device task data). The user device can obtain the collaborating device task data from the collaborating device, and generate task data that can include user device task data and collaborating device task data.

The requestor can receive the task data and complete the task based upon the task data. The group can be disbanded or otherwise terminated by the user device and/or by the devices participating in the task collaboration. In some embodiments, the group can be permanently disbanded, while in some other embodiments, the requestor can store information relating to the group and/or provide the information to a remote device such as the collaboration service. Thus, the groups can be temporary and permanently deleted after task completion, or the groups can be disbanded but reinitiated at some later time.

In another embodiment, two or more devices can enter the proximity of the requestor. The requestor can generate a trigger to one or more of the devices or the devices can self-generate the trigger. The one or more devices that elect to collaborate on a task can join a group. The requestor can provide the collaboration data to the devices, the devices can present and/or perform operations on the collaboration data, and provide device task data to the requestor. The group can be disbanded, permanently or temporarily as explained above.

According to one aspect of the concepts and technologies disclosed herein, a method is disclosed. The method can include detecting, at a computing device including a processor, an opportunity to initiate collaboration on a task by a group of devices including a collaborating device. The method also can include creating, by the computing device, the group of devices, providing, by the computing device, collaboration data to the collaborating device, and obtaining, by the computing device, input generated by the collaborating device based upon the collaboration data. The method also can include terminating, by the computing device, the group.

In some embodiments, the method also can include obtaining, from a requestor in a proximity of the computing device, the collaboration data. In some embodiments, detecting the opportunity can include entering a proximity of a requestor and receiving, from the requestor, a trigger to initiate a collaboration session. The trigger can include a wireless signal generated by a transceiver associated with the requestor.

In some embodiments, the method also can include generating, by the computing device, task data including the input generated by the collaborating device and further input generated by the computing device, and providing, by the computing device, the task data to a requestor in a proximity of the computing device. In some embodiments, creating the group of devices can include discovering, by the computing device, the collaborating device in a proximity of the computing device, sending, by the computing device, an invitation to the collaborating device, the invitation including data identifying a task, and receiving, by the computing device, a response to the invitation, the response indicating that the collaborating device will collaborate.

In some embodiments, detecting the opportunity to collaborate can include receiving a trigger from a requestor. The trigger can include the data identifying the task. In some embodiments, the computing device can include a presence sensor, and the computing device can generate a trigger and transmit the trigger to a user device when the user device is detected in a proximity of the computing device. In some embodiments, the method can further include storing data associated with the group and recreating the group when the collaborating device is detected in the proximity.

According to another aspect of the concepts and technologies disclosed herein, a system is disclosed. The system can include a processor and a memory. The memory can store computer-executable instructions that, when executed by the processor, cause the processor to perform operations. The operations can include detecting an opportunity to initiate collaboration on a task by a group of devices including a collaborating device, creating the group of devices, providing collaboration data to the collaborating device, obtaining input generated by the collaborating device based upon the collaboration data, and terminating the group.

In some embodiments, the group of devices can include a user device. The user device can operate as a controller device that controls the collaboration, and obtaining the input can include obtaining further input generated by the user device. In some embodiments, detecting the opportunity can include detecting a user device in a proximity of a requestor and sending, from the requestor, a trigger to initiate the collaboration. In some embodiments, the instructions, when executed by the processor, can cause the processor to perform operations further including obtaining, from the user device, task data including the input generated by the collaborating device and further input generated by the user device.

In some embodiments, creating the group of devices can include discovering the collaborating device and a user device in a proximity of the computing device, determining that the user device and the collaborating device will collaborate, and creating the group of devices. The group of devices can include the user device and the collaborating device. In some embodiments, the system can include a presence sensor, and a trigger can be generated and transmitted to a user device when the user device is detected in a proximity of a requestor by the presence sensor.

According to yet another aspect, a computer storage medium is disclosed. The computer storage medium can have computer-executable instructions stored thereon that, when executed by a processor, cause the processor to perform operations. The operations can include detecting an opportunity to initiate collaboration on a task by a group of devices including a collaborating device, creating the group of devices, providing collaboration data to the collaborating device, obtaining input generated by the collaborating device based upon the collaboration data, and terminating the group.

In some embodiments, the group of devices can include a user device, the user device can operate as a controller device that controls the collaboration, and obtaining the input can include obtaining further input generated by the user device. In some embodiments, detecting the opportunity can include detecting the user device in a proximity of a requestor and sending, from the requestor, a trigger to initiate the collaboration. In some embodiments, the instructions, when executed by the processor, cause the processor to perform operations further including obtaining, from the user device, task data including the input generated by the collaborating device and further input generated by the user device. In some embodiments, creating the group of devices can include discovering the collaborating device and a user device in a proximity of the computing device, determining that the user device and the collaborating device will collaborate, and creating the group of devices, wherein the group of devices can include the user device and the collaborating device.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

Figure 1A:
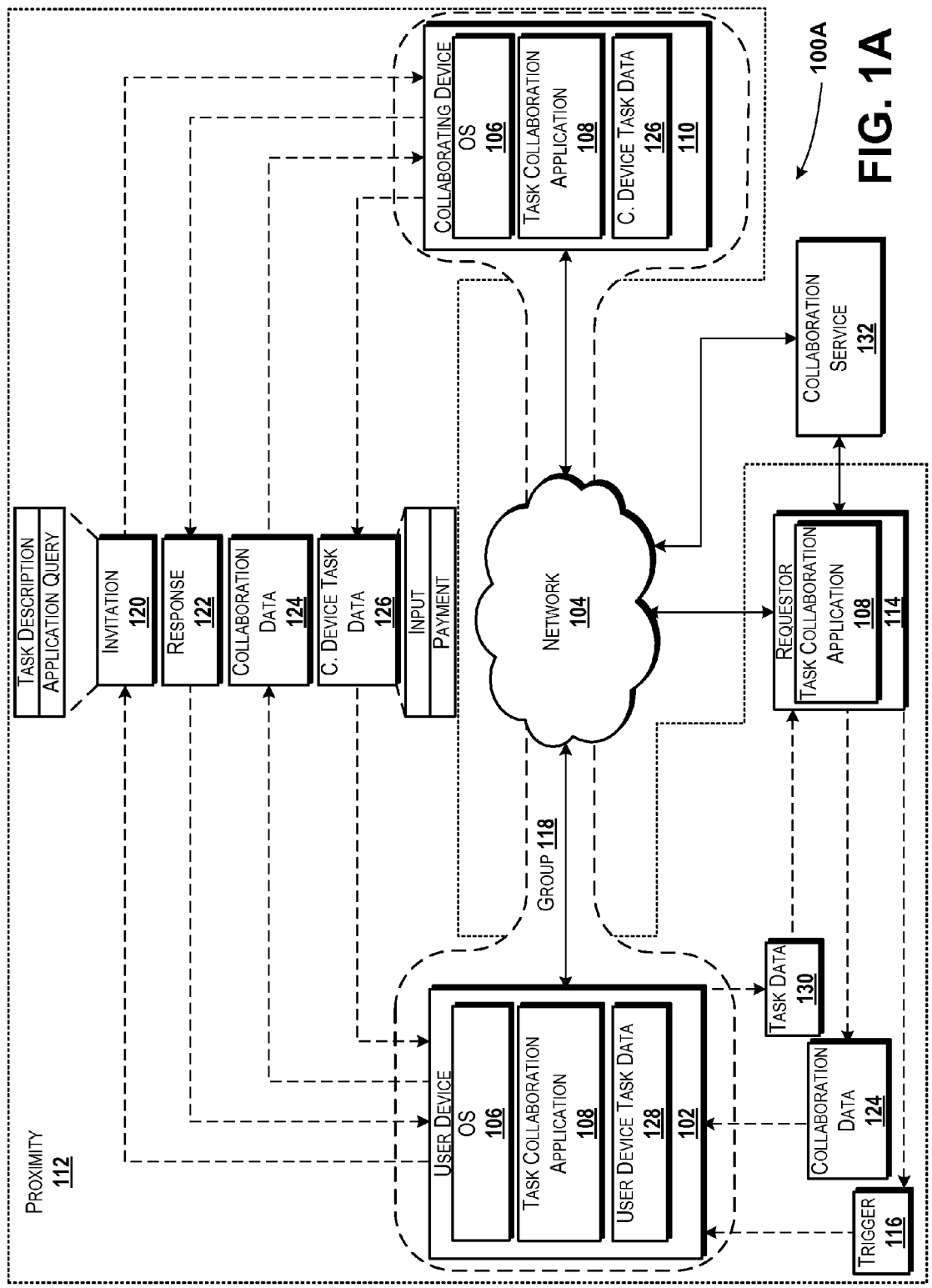
FIGS. 1A-1B are system diagrams illustrating illustrative operating environments for various embodiments of the concepts and technologies described herein.

The following detailed description is directed to creating and using groups for task collaboration. A requestor can be located at a particular location. The requestor can include a computer that can execute one or more software modules, applications, or the like for creating and/or controlling groups for collaborating during completion of a task. In some embodiments, the requestor can execute a task collaboration application. One or more devices can enter a proximity of the requestor. The devices can include a user device, which can operate as a controller device in some embodiments. The requestor can generate a trigger and transmit the trigger to the user device. In some other embodiments, the user device can detect the requestor and/or visual, audio, or digital signals or indicia associated with the requestor and self-create the trigger. In response to the trigger, the user device can determine that an opportunity or application for a collaboration session exists, and discover collaboration-enabled devices in the proximity of the requestor or the user device.

The user device can send invitations to the devices and query the devices, via the invitations, to determine if the devices are collaboration-enabled and/or wish to participate in the collaboration session. The invitation can explicitly or implicitly request collaboration from the devices. The devices can respond via a response. The user device can create a group of devices that have selected to participate in the task collaboration and obtain collaboration data from the requestor. The user device also can provide the collaboration data to the one or more members of the group such as, for example, a collaborating device. In some embodiments, the user device can divide the collaboration data among the devices in the group, and in other embodiments the user device can send copies of the collaboration data to the devices in the group.

The user device and the one or more collaborating device can execute a portion of the task assigned to those devices or a device-specific iteration of the task. In some embodiments, the user device and/or the collaborating device can present one or more user interfaces for presenting and/or interacting with the collaboration data, and generate device task data (e.g., user device task data and/or collaborating device task data). The user device can obtain the collaborating device task data from the collaborating device, and generate task data that can include user device task data and collaborating device task data.

The requestor can receive the task data and complete the task based upon the task data. The group can be disbanded or otherwise terminated by the user device and/or by the devices participating in the task collaboration. In some embodiments, the group can be permanently disbanded, while in some other embodiments, the requestor can store information relating to the group and/or provide the information to a remote device such as the collaboration service. Thus, the groups can be temporary and permanently deleted after task completion, or the groups can be disbanded but reinitiated at some later time.

In another embodiment, two or more devices can enter the proximity of the requestor. The requestor can generate a trigger to one or more of the devices or the devices can self-generate the trigger. The one or more devices that elect to collaborate on a task can join a group. The requestor can provide the collaboration data to the devices, the devices can present and/or perform operations on the collaboration data, and the devices can provide device task data to the requestor. The group can be disbanded, permanently or temporarily as explained above.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1A, aspects of an operating environment 100A for various embodiments of the concepts and technologies disclosed herein for creating and using groups for task collaboration will be described, according to an illustrative embodiment. The operating environment 100A shown in FIG. 1A includes a user device 102. The user device 102 can operate in communication with and/or as part of a communications network ("network") 104, though this is not necessarily the case.

According to various embodiments, the functionality of the user device 102 may be provided by one or more computing devices such as one or more server computers, desktop computers, mobile telephones, smartphones, laptop computers, vehicle computing systems, other computing systems, and the like. It should be understood that the functionality of the user device 102 can be provided by a single device, by two similar devices, and/or by two or more dissimilar devices. For purposes of describing the concepts and technologies disclosed herein, the user device 102 is described herein as a smartphone. It should be understood that this embodiment is illustrative, and should not be construed as being limiting in any way.

The user device 102 can execute an operating system 106 and one or more application programs such as, for example, a task collaboration application 108. The operating system 106 is a computer program for controlling the operation of the user device 102. The task collaboration application 108 is an executable program configured to execute on top of the operating system 106 to provide the functionality described herein for creating and using groups for task collaboration.

The functionality of the task collaboration application will be described in more detail below.

As seen in FIG. 1A, the user device 102 can communicate with a collaborating device 110 in a proximity 112 of the user device 102. It will be understood with reference to the description below, that the collaborating device 110 may be a neighboring device until the user device 102 and/or the collaborating device 110 begin collaborating on a task or other project as illustrated and described herein. Thus, the term "collaborating device" as used herein should not be construed as being limiting, and instead is used to identify the eventual task of the neighboring device.

In some other embodiments, the collaborating device 110 can be a device that has a pre-existing association and/or relationship with the user device 102. Thus, for example, the user device 102 and the collaborating device 110 may be two devices that share a voice/data plan, two devices on a family plan, two devices used by two coworkers, combinations thereof, or the like. As such, the collaborating device 110 may be a collaborating device prior to the collaboration as illustrated and described herein. It should be understood that this example is illustrative and therefore should not be construed as being limiting in any way.

The proximity 112 can include an area at or near the user device 102. The proximity 112 can correspond to an area at which the collaborating device 110 and the user device 102 can sense one another and/or communicate with one another as illustrated and described herein below. Thus, according to various embodiments of the concepts and technologies described herein, the proximity 112 can include an area at or near the user device 102, and an area at which the user device 102 (and in some embodiments the collaborating device 110) can communicate, sense the presence of, and/or be sensed by a requestor 114. The requestor 114 can correspond to a point-of-sale ("POS") device; a beacon; a transceiver, receiver, or transmitter associated with a store, office, school, or other entity; other devices; combinations thereof or the like.

According to various embodiments, the requestor 114 can include a memory; a processor; and a wireless or wired receiver, transmitter and/or transceiver. The functionality of the requestor 114 therefore can be provided by a computing device such as a computer, a server, or other device that can have or be in communication with a transceiver. The transceiver can communicate using a wireless protocol or technology such as, for example, cellular technologies, BLUETOOTH technologies, WiFi technologies, WiMAX technologies, combinations thereof, or the like. In various embodiments, the requestor 114 can execute a task collaboration application 108 or other software, application, module, or the like to initiate and control execution of a task as illustrated and described herein. In some embodiments, the requestor 114 can omit the transceiver (or receiver) and can include one or more detection device such as a hardware switch, a proximity sensor, or the like, to detect a presence of one or more entities (e.g., the user device 102, the collaborating device 110, or others) at or near the requestor 114.

Similarly, in some embodiments, the requestor 114 can omit the transceiver (or transmitter) and can include a speaker, a screen, or other mechanism that can prompt the user device 102, the collaborating device 110, and/or other devices to create or join a group as illustrated and described herein. Thus, while the requestor 114 is described herein as detecting presence of devices or entities and/or passing information to the devices or entities using a transceiver, it should be understood that other methods and/or mechanisms can be used to support communications between the requestor 114 and one or more devices. As such, the described embodiments should be understood as being example embodiments and should not be construed as being limiting in any way.

According to some embodiments, the requestor 114 can detect the user device 102 in the proximity 112 of the requestor 114 by detecting a wireless signal from the user device 102 such as a WiFi signal, a cellular signal, a WiMAX signal, a BLUETOOTH signal, a near field communication ("NFC") signal, a radio frequency identification ("RFID") signal, or other signals. According to some other embodiments, the requestor 114 can detect the user device 102 in the proximity 112 of the requestor 114 by detecting the user device 102 using an optical sensor, an infrared ("IR") sensor, or other visual or proximity sensor; a pressure sensor or other mechanical presence sensor; a location service or server or other location device; combinations thereof; or the like. Regardless of how the requestor 114 detects the presence of the user device 102 in the proximity 112, the requestor 114 can generate a trigger 116 and communicate the trigger 116 to the user device 102.

The trigger 116 can include a command for the user device 102 to initiate, create, or join a group 118. The group 118 can include a group of two or more devices that can operate together or in conjunction with one another on a task. A communication session during which the two or more devices collaborate is referred to herein as a "task session" or a "task collaboration." According to some embodiments of the concepts and technologies described herein, the group 118 can include the user device 102 and at least one other device such as the collaborating device 110, which can complete compute operations to accomplish a task. In some embodiments, one of the devices can act as a controller device to create and coordinate the task collaboration. According to some other embodiments, the group 118 can include two or more devices that interact to complete the task without a controller device. Additional details of the embodiments that do not include a controller device are illustrated and described in more detail below with reference to FIG. 1B.

In the embodiment illustrated in FIG. 1A, the user device 102 can function as the controller device briefly mentioned above. The user device 102 therefore can receive the trigger 116 from the requestor 114. In response to the trigger 116, the user device 102 can identify one or more devices in the proximity 112 of the user device 102. The devices can be identified by the user device 102 by polling wireless communication channels, by sending and/or receiving wireless information, by generating emails, text messages, multimedia message service ("MMS") messages, by receiving input via a graphical user interface ("GUI"), combinations thereof, or the like. In the illustrated embodiment, the user device 102 can access various wireless receivers, transmitters, and/or transceivers associated with the user device 102 and identify one or more devices in the proximity 112. Because the discovery of devices in the proximity 112 can be accomplished in additional and/or alternative manners, it should be understood that these examples are illustrative and therefore should not be construed as being limiting in any way.

Although not shown in FIG. 1A, the user device 102 can generate a list of devices that are discovered in the proximity 112. The discovery of the devices and/or the generation of the list (if completed) can be completed by the user device 102 via execution of the task collaboration application 108, though this is not necessarily the case. In the illustrated embodiment, the user device 102 discovers at least one device in the proximity 112, with the device being labeled in FIG. 1A as the collaborating device 110. As noted above, the collaborating device 110 may not collaborate with the user device 102 prior to the discovery of the collaborating device 110 by the user device 102 and/or the subsequent operations illustrated and described herein. As such, the phrase "collaborating device" should not be construed as being limiting. Furthermore, it should be understood that the collaborating device 110 can function as the controller device and can discover the devices in the proximity 112 such as the user device 102. As such, the illustrated embodiment should not be construed as being limiting in any way.

In response to receiving the trigger 116, the user device 102 can, via execution of the task collaboration application 108, generate one or more invitation 120. The user device 102 can transmit the one or more invitation 120 to the devices discovered by the user device 102 in the proximity 112. The invitation 120 can include a task description and an application query. The task description can describe a task for which the task collaboration is being requested, suggested, or is available. In some embodiments, the trigger 116 can include the task description. It should be understood that this example is illustrative and therefore should not be construed as being limiting in any way.

The task description can identify, for example, a food order process, a financial transaction, a data analysis process, a registration process, or other task that is to be divided or replicated by devices in the group 118 to enable task collaboration by the devices. In one example, a vehicle with three coworkers may approach a drive thru order queue at a restaurant. One of the coworkers may own or possess a device similar to the user device 102, and at least one of the coworkers (or both) may own or possess a device similar to the collaborating device 110. Upon detecting the vehicle at the drive thru queue, a device similar or even identical to the requestor 114 may generate the trigger 116. The trigger 116 can be generated as a wireless broadcast signal; an audio signal; a two dimensional barcode that, when scanned, triggers the functionality illustrated and described herein; other visual or audio indicia; combinations thereof; or the like.

The trigger 116 can include data that specifies an order process for the subject of the task collaboration, and the user device 102 can generate an invitation 120 that includes the task description (in this case "order process"). As noted above, the invitation 120 also can include an application query. The application query can be provided by a query string, an object, a flag, or the like. When the application query is received by a device such as the collaborating device 110, the collaborating device 110 can respond with an indication of whether or not the collaborating device 110 is enabled for task collaboration. In some embodiments, the collaborating device 110 can indicate that the collaborating device 110 is enabled for task collaboration by determining that the task collaboration application 108 is installed and/or executing at the collaborating device 110. It should be understood that this example is illustrative and therefore should not be construed as being limiting in any way.

The collaborating device 110 can, via execution of the task collaboration application 108, generate a response 122. The response 122 can respond to the invitation 120 and therefore can include data that specifies whether or not the collaborating device 110 is enabled for task collaboration and/or whether the collaborating device 110 will be participating in the task collaboration. In some embodiments, the collaborating device 110 can present a GUI that queries a user or other entity to select whether or not the collaboration will be participated in by the collaborating device 110. It should be understood that this example is illustrative and therefore should not be construed as being limiting in any way.

Upon receiving one or more response 122, the user device 102 can create the group 118. It should be understood that if all responses 122 received by the user device 102 indicate that the associated devices and/or users have chosen to decline participation in the task collaboration operation, the group 118 may not be created. Upon receiving the one or more response 122 that indicates that task collaboration will be participated in by a device such as the collaborating device 110, the user device 102 can obtain data or information for use in the task collaboration session ("collaboration data") 124.

The collaboration data 124 can include objects, data, information, and/or combinations thereof that can be used, operated on, and/or interacted with by devices during a task collaboration session. The collaboration data 124 therefore can include, but is not limited to, software code, objects, or other software data; graphics data, images, video, or other visual data; prices, descriptions, percentages, rates, or other numerical parameters, variables, or data; data structures; other data; combinations thereof; or the like. Thus, the collaboration data 124 can include data that will be displayed and/or operated on by the user device 102 and the collaborating device 110 (and/or other devices that join the group 118) during the task collaboration.

According to various embodiments, the user device 102 can obtain the collaboration data 124 and present one or more user interfaces for completing a portion of the task collaboration session that is assigned to or associated with the user device 102. The user device 102 also can forward the collaboration data 124 to other devices participating in the collaboration session such as, the collaborating device 110. It can be appreciated that the user device 102 can be configured to modify the collaboration data 124, in some embodiments, before forwarding the collaboration data 124 (or a version or portion thereof) to one or more devices such as the collaborating device 110.

The collaborating device 110 can receive the collaboration data 124 and, as mentioned above with respect to the user device 102, present one or more user interfaces at the collaborating device 110 for completion of a portion of the task assigned to the collaborating device 110. In one example, the collaboration session or other form of the task collaboration can include a food ordering process. Thus, the collaboration data 124 can include a menu, prices, or the like, and the devices that receive the collaboration data 124 can present ordering and/or payment screens that can include the collaboration data 124 and/or portions thereof. Some example user interfaces are illustrated and described below with reference to FIGS. 7A-7G.

The collaborating device 110 can be used to complete a portion of the task collaboration. During or after completion of the portion of the task collaboration, the collaborating device 110 can generate collaborating device task data 126. The collaborating device task data 126 can include input, selections, and/or other information or data that can be used in association with the task collaboration. In the above example of a food order, the collaborating device task data 126 can correspond to an order and/or payment information associated with the collaborating device 110. It should be understood that this example is illustrative and therefore should not be construed as being limiting in any way.

Similarly, the user device 102 can generate device task data such as the user device task data 128, which can reflect information generated by the user device 102 during completion of the task or a portion thereof at the user device 102. The user device 102 can receive or otherwise obtain the collaborating device task data 126 and the user device task data 128. Also, the user device 102 can receive or obtain device task data from other devices participating in the collaboration session. The user device 102 can combine the various versions or iterations of the device task data and generate task data 130. The task data 130 can represent the completion of the task and/or the data output from each device involved in the collaboration session. The user device 102 can provide the task data 130 to the requestor 114. It should be understood that this example is illustrative and therefore should not be construed as being limiting in any way.

The requestor 114 can obtain the task data 130 and perform any desired operations on the task data 130. In the example of a food order process, the requestor 114 can process payment information provided by the devices, enter orders associated with the devices, and/or take other operations with respect to the task data 130. In some embodiments, the requestor 114 can track information that identifies what device or user produced or generated what portion of the task data 130 and/or use that information. Thus, in the example of a food order, the requestor 114 can associate an order with a device and use that information (e.g., to label bags or plates with the user's name, etc.). Thus, the task data 130 can include, in some embodiments, data that identifies users and/or devices and the device task data associated with those users or devices. It should be understood that this example is illustrative and therefore should not be construed as being limiting in any way.

In some embodiments, the requestor 114 can communicate with a collaboration service 132 for the storage of task data 130 and/or other information relating to the task data 130. Thus, for example, the collaboration service 132 can store user identities associated with a task collaboration and/or a particular location such as the proximity 112. When the user device 102 enters the proximity, the requestor 114 can query the collaboration service 132 with identifying information relating to the user device 102 and create the group 118 without necessarily requiring the invitations 120 and/or the responses 122. Thus, the group 118 can be temporary and/or can be persisted in a data storage device such as the memory of the requestor 114 and/or a data storage associated with and/or accessible by the collaboration service 132. It should be understood that these examples are illustrative and therefore should not be construed as being limiting in any way.

In practice, one or more devices can enter the proximity 112 of the requestor 114. The requestor 114 can generate a trigger 116 and transmit the trigger 116 to the user device 102. In some other embodiments, the user device 102 can detect the requestor 114 and/or visual, audio, or digital signals or indicia associated with the requestor 114 and self-create the trigger 116. In response to the trigger 116, the user device 102 can determine that an opportunity for a collaboration session exists, and discover collaboration-enabled devices in the proximity 112.

As explained above, the user device 102 can discover devices in the proximity 112 and query the devices to determine if the devices are collaboration-enabled by way of the invitation 120. The invitation 120 also can explicitly or implicitly request collaboration from the devices. The devices can respond via a response 122. The user device 102 can create a group 118 of devices that have selected to participate in the task collaboration and obtain collaboration data 124 from the requestor 114. The user device 102 also can provide the collaboration data 124 to the one or more members of the group 118 such as, for example, the collaborating device 110.

The user device 102 and the collaborating device 110 can execute a portion of the task assigned to those devices. In some embodiments, the user device 102 and/or the collaborating device 110 can present one or more user interfaces for presenting and/or interacting with the collaboration data 124, and generate device task data (e.g., the user device task data 128 and/or the collaborating device task data 126). The user device 102 can obtain the collaborating device task data 126 from the collaborating device 110, and generate task data 130 that can include the user device task data 128 and the collaborating device task data 126.

The requestor 114 can receive the task data 130 and complete the task based upon the task data 130. The group 118 can be terminated or disbanded by the user device 102 and/or by the devices participating in the task collaboration. In some embodiments, the group 118 can be permanently disbanded, while in some other embodiments, the requestor 114 can store information relating to the group 118 and/or provide the information to a remote device such as the collaboration service 132. Thus, the groups 118 can be temporary and permanently deleted after task completion, or the groups 118 can be disbanded but reinitiated at some later time.

Figure 1B:
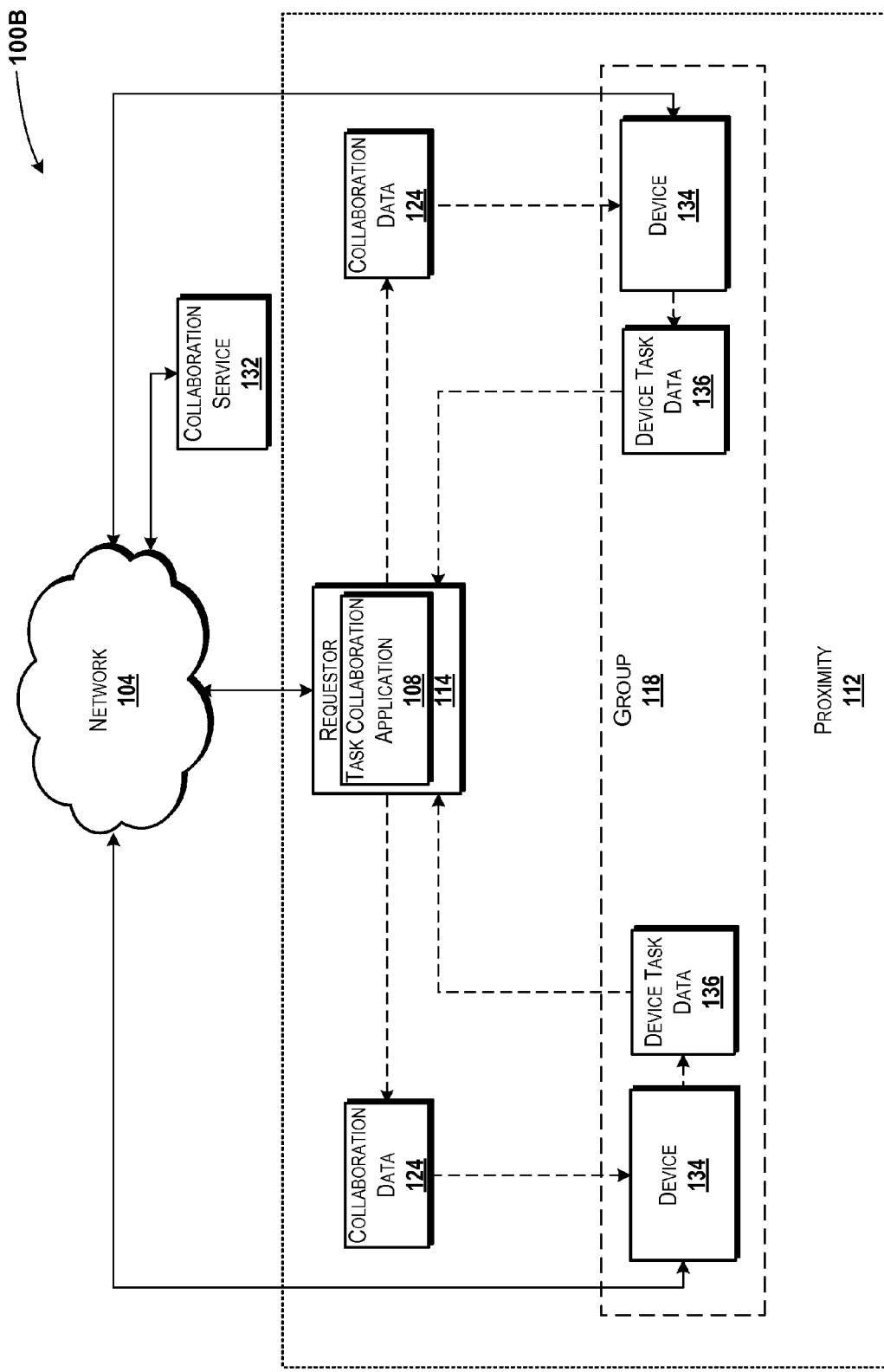

Turning now to FIG. 1B, some alternative embodiments of the concepts and technologies described herein will be described in detail. Briefly, while FIG. 1A illustrates an operating environment 100A in which the user device 102 operates as a controller device to initiate and/or operate the collaboration session, the operating environment 100B shown in FIG. 1B can omit a controller device. It should be understood that this example is illustrative and therefore should not be construed as being limiting in any way.

In FIG. 1B, the requestor 114 can communicate with one or more devices 134. The devices 134 can include, for example, one or more of the user devices 102 illustrated in FIG. 1A, one or more of the collaborating devices 110 illustrated in FIG. 1A, and/or other devices not illustrated in FIG. 1A. Thus, it should be understood that the devices 134 can execute the task collaboration application 108 illustrated and described herein. It should be understood that this example is illustrative and therefore should not be construed as being limiting in any way.

Although not shown in FIG. 1B, the devices 134 can receive a trigger such as the trigger 116 illustrated and described above with reference to FIG. 1A. In response to the trigger 116, which can function as the invitation 120, the devices 134 can respond by accepting or declining task collaboration. The requestor 114 can provide the collaboration data 124 directly to the devices 134. The devices 134 can present the collaboration data 124, obtain input relating to the task, and generate and provide device task data 136 to the requestor 114. The requestor 114 can use the device task data 136 in a manner similar to that described in FIG. 1A with respect to the task data 130, though this is not necessarily the case. It should be understood that this example is illustrative and therefore should not be construed as being limiting in any way.

In practice, two or more devices 134 can enter the proximity 112 of the requestor 114. The requestor 114 can generate a trigger 116 to one or more of the devices 134 or the devices 134 can self-generate the trigger 116. The one or more devices 134 that elect to collaborate on a task can join a group 118. The requestor 114 can provide the collaboration data 124 to the devices 134, the devices 134 can present and/or perform operations on the collaboration data 124, and provide device task data 136 to the requestor 114. The group 118 can be disbanded, permanently or temporarily as explained above. Additional details of creating the groups 118 and collaborating on a task are illustrated and described in more detail below, particularly with reference to FIGS. 2-7G.

FIG. 1A illustrates one user device 102, one network 104, one collaborating device 110, one requestor 114, one group 118, and one collaboration service 132. Similarly, FIG. 1B illustrates one network 104, one requestor 114, one group 118, one collaboration service 132, and two devices 134. It should be understood, however, that various implementations of the operating environment 100A and/or the operating environment 100B can include zero, one, or more than one user device 102; zero, one, or more than one network 104; zero, one, or more than one collaborating device 110; zero, one, or more than one requestor 114; zero, one, or more than one group 118; zero, one, or more than one collaboration service 132; and/or zero, one, two, or more than two devices 134. As such, the illustrated embodiment should be understood as being illustrative, and should not be construed as being limiting in any way.

Figure 2:
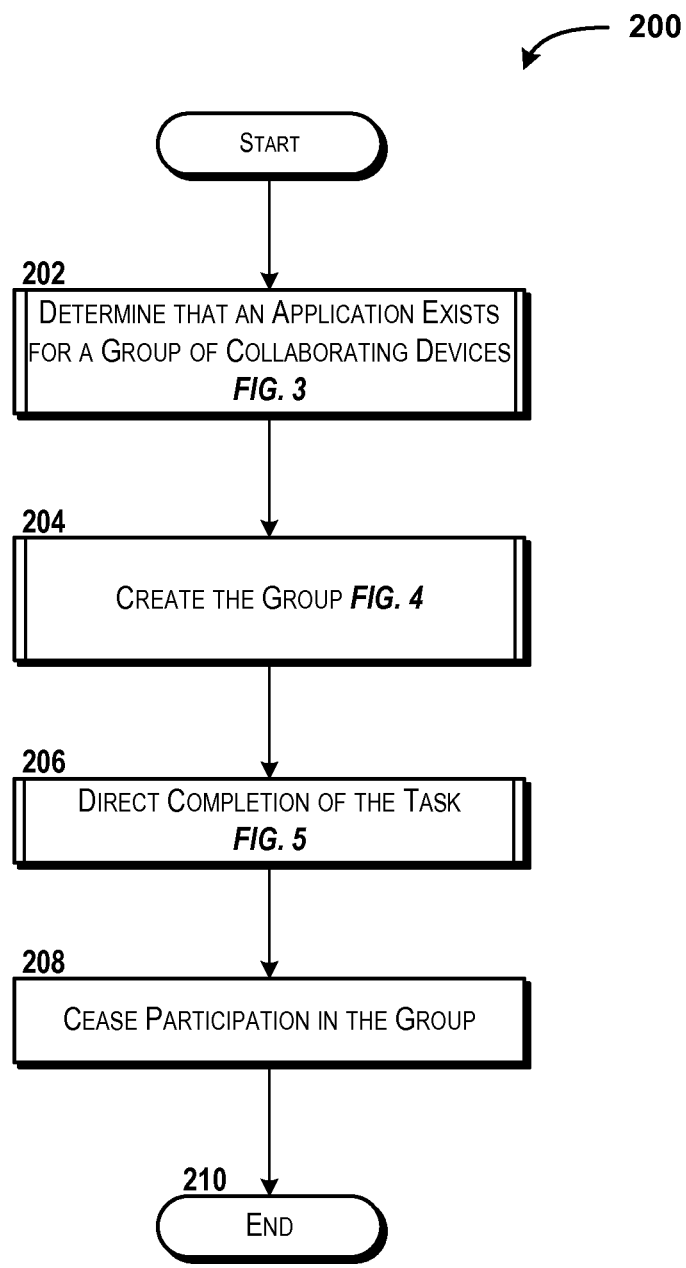
FIG. 2 is a flow diagram showing aspects of a method for creating and using groups for task collaboration, according to an illustrative embodiment of the concepts and technologies described herein.

Turning now to FIG. 2, aspects of a method 200 for creating and using groups for task collaboration will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the user device 102, the collaborating device 110, and/or the requestor 114 to perform one or more operations and/or causing the processor to direct other components of the computing system or device to perform one or more of the operations.

For purposes of illustrating and describing the concepts of the present disclosure, the methods disclosed herein are described as being performed by the user device 102 via execution of one or more software modules such as, for example, the task collaboration application 108, or the requestor 114 via execution of an application such as the task collaboration application 108, a point-of-sale application, a collaboration module, combinations thereof, or the like. It should be understood that additional and/or alternative devices and/or network nodes can provide the functionality described herein via execution of one or more modules, applications, and/or other software including, but not limited to, the task collaboration application 108 and/or other applications or modules mentioned herein. Thus, the illustrated embodiments are illustrative, and should not be viewed as being limiting in any way.

The method 200 begins at operation 202. At operation 202, the user device 102 can determine that an application or opportunity exists to use a group of collaborating devices to collaborate on a task. In operation 202, the user device 102 can determine that an opportunity exists to use a task collaboration or collaboration session as illustrated and described herein. This determination can be made based upon audio signals, visual signals and/or indicia, digital signals, combinations thereof, or the like. Furthermore, as mentioned above, related devices or users can be predisposed or preconfigured to collaborate on tasks, in some embodiments. Additionally, the determining can include detecting presence of the user device 102 at a particular location, or the like. The determining also can include receiving a trigger or command to collaborate, for example. Additional aspects of determining and/or detecting an application for a group of collaborating devices are illustrated and described in more detail below with reference to FIG. 3.

From operation 202, the method 200 proceeds to operation 204. At operation 204, the user device 102 can create the group of collaborating devices. According to various embodiments, the user device 102 can discover devices in the proximity 112 of the user device 102 and invite one or more of the devices to join the group 118 and/or to join a collaboration session or task collaboration. The user device 102 also can obtain responses 122 from the one or more devices and create a group 118 that includes the devices that elect to join the group 118 by agreeing to collaborate. The group 118 can be created in other ways (e.g., by identifying a group 118 that was not permanently deleted after a previous collaboration, by identifying related devices, or the like). As such, this example should be understood as being illustrative and should not be construed as being limiting in any way. Additional aspects of creating the group 118 of collaborating devices are illustrated and described in more detail below with reference to FIG. 4.

From operation 204, the method 200 proceeds to operation 206. At operation 206, the user device 102 can direct completion of the task. In the embodiment shown in FIG. 2, the user device 102 can act as a controller device for the group collaboration and/or a task collaboration or collaboration session associated with the group collaboration. As such, the user device 102 can obtain data from the requestor 114 and/or the devices in the group 118 and orchestrate completion of the task. Additional aspects of detecting an application for a group 118 of collaborating devices are illustrated and described in more detail below with reference to FIG. 5.

From operation 206, the method 200 proceeds to operation 208. At operation 208, the user device 102 can cease participation in the group 118 or perform other operations to terminate, disband, or discontinue use of the group 118. While FIG. 2 illustrates the user device 102 ceasing participation in the group 118, it should be understood that the group 118 can be terminated, disbanded, or otherwise discontinued by other devices, in some embodiments. For example, as explained above, participation in the group 118 can be ended by the user device 102 when a task for which the group 118 was established is completed or cancelled. Additionally, or alternatively, the group 118 can be disbanded or terminated after completing a task for which the group 118 was created. Thus, the concepts and technologies described herein can support temporary or transient groups 118 of devices for collaborating on a particular task. In some embodiments, the user device 102 (or other device that acts as the controller device), the requestor 114, and/or other entities such as the collaboration service 132 can store information relating to the group 118 so that the group 118 can be revived and/or reused at a future time. As such, while some embodiments of the concepts and technologies described herein support temporary groups 118, it should be understood that the groups 118 are not necessarily temporary in all embodiments.

From operation 208, the method 200 proceeds to operation 210. The method 200 ends at operation 210.

Figure 3:
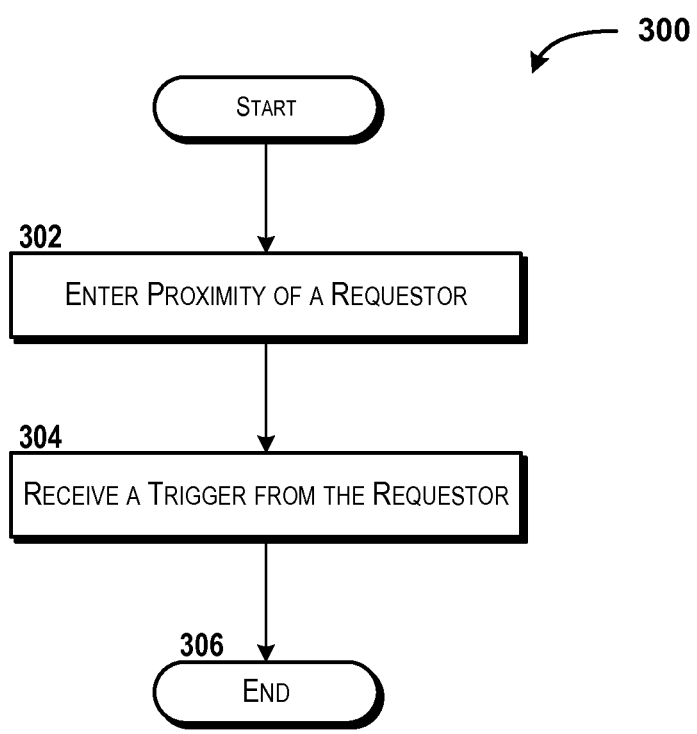
FIG. 3 is a flow diagram showing aspects of a method for detecting an application for a group of collaborating devices, according to an illustrative embodiment of the concepts and technologies described herein.

Turning now to FIG. 3, aspects of a method 300 for determining that an application or opportunity exists for a group 118 of collaborating devices will be described in detail, according to an illustrative embodiment of the concepts and technologies described herein. It should be understood that the operations of the method 300 illustrated and described herein can be, but are not necessarily, performed by the user device 102 at operation 202 of the method 200 illustrated and described above with reference to FIG. 2. It should be understood that this example is illustrative and therefore should not be construed as being limiting in any way.

The method 300 begins at operation 302. At operation 302, the user device 102 can enter the proximity 112 of a requestor 114 or detect presence of the user device 102 within the proximity 112. According to various embodiments, the user device 102 can detect entrance into the proximity 112 of the requestor 114 in a number of manners. For example, the requestor 114 can be configured to emit audio, visual, and/or radio signals that, when received, detected, or observed by the user device 102, can indicate to the user device 102 that the user device 102 is within the proximity 112 of the requestor 114.

In some other embodiments, the user device 102 can be configured to periodically emit a signal that, when received by the requestor 114, can cause the requestor 114 to recognize presence of the user device 102 and to generate a signal or message to the user device 102 indicating the availability of collaboration. In some other embodiments, the requestor 114 can include an NFC or RFID transmitter, receiver, and/or transceiver. Thus, when the user device 102 enters the proximity 112, the requestor 114 can trigger communications with the user device 102 as illustrated and described herein.

In yet other embodiments, as mentioned above, the requestor 114 can detect presence of the user device 102 and generate an audio signal, or the like that, when detected by the user device 102, can prompt the user device 102 to initiate communications with the requestor 114. Because the user device 102 can enter the proximity 112, detect entry to the proximity 112, and/or be detected within the proximity 112 in additional and/or alternative ways, it should be understood that these examples are illustrative and therefore should not be construed as being limiting in any way.

From operation 302, the method 300 proceeds to operation 304. At operation 304, the user device 102 can receive a trigger 116 from the requestor 114. The trigger 116 can correspond to a signal, packet, visual indicia, audio signal, or other event that can trigger the user device 102 to detect the availability of the collaboration session or task collaboration. As explained above, the user device 102 also can be configured to self-generate the trigger 116, in some embodiments. For example, the user device 102 can detect the presence of the requestor 114 in the proximity of the user device 102 and determine that a task collaboration or collaboration session is available based upon that determination. Because the trigger 116 can be provided to or generated by the user device 102 in additional and/or alternative ways, it should be understood that these examples are illustrative and therefore should not be construed as being limiting in any way.

From operation 304, the method 300 proceeds to operation 306. The method 300 ends at operation 306. Because the user device 102 can determine that an opportunity or application for a group 118 of collaborating devices exists in various manners including, but not limited to, detecting a proximity of a requestor 114, it should be understood that this example is illustrative and therefore should not be construed as being limiting in any way.

Figure 4:
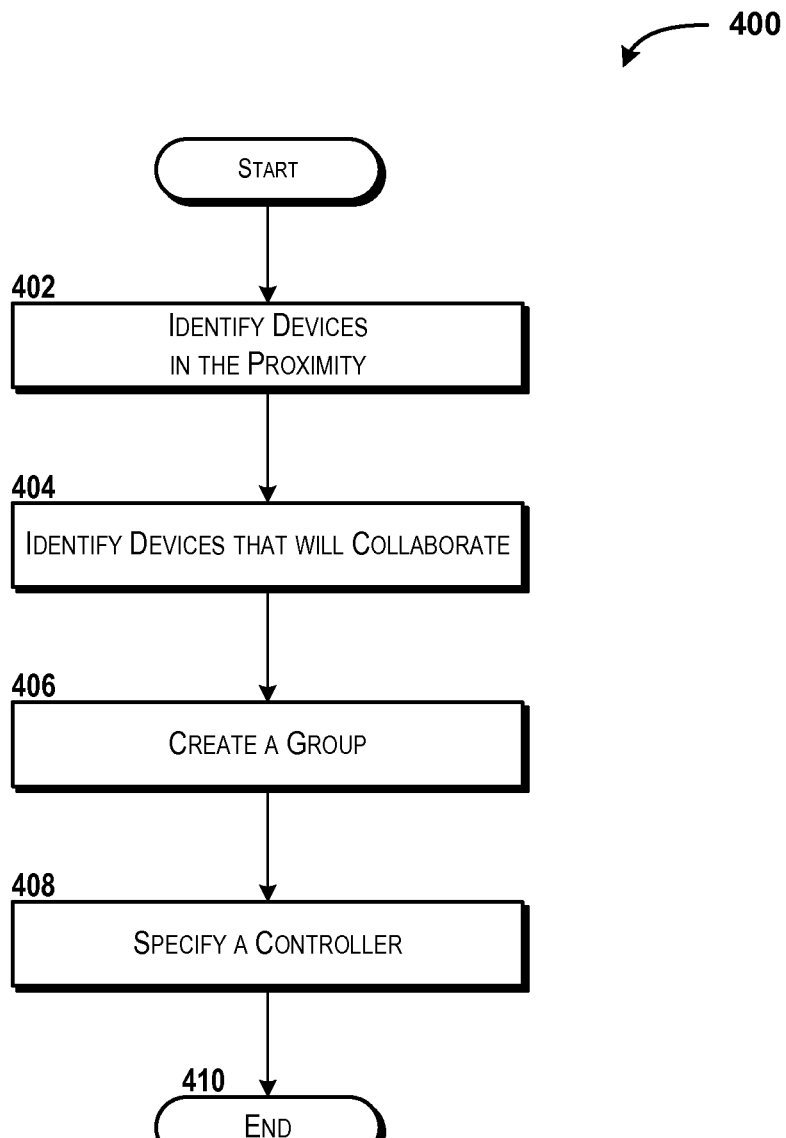
FIG. 4 is a flow diagram showing aspects of a method for creating a group of collaborating devices, according to an illustrative embodiment of the concepts and technologies described herein.

Turning now to FIG. 4, aspects of a method 400 for creating a group 118 of collaborating devices will be described in detail, according to an illustrative embodiment of the concepts and technologies described herein. It should be understood that the operations of the method 400 illustrated and described herein can be, but are not necessarily, performed by the user device 102 at operation 204 of the method 200 illustrated and described above with reference to FIG. 2. It should be understood that this example is illustrative and therefore should not be construed as being limiting in any way.

The method 400 begins at operation 402. At operation 402, the user device 102 can identify one or more devices in the proximity 112 of the user device 102. According to various embodiments, the user device 102 can discover devices in the proximity 112 using various wireless, wired, optical, and/or other proximity and/or presence detection technologies. As explained above, the user device 102 can discover the devices using WiFi signals, BLUETOOTH signals, cellular communication signals, WiMAX signals, IR transmissions, RFID and/or NFC transmissions, or the like.

The user device 102 also can obtain information (directly or indirectly, e.g., through the requestor 114) that indicates devices that are in the proximity 112. In one contemplated embodiment, the user device 102 can obtain a list of devices in the proximity 112. This information can be provided by the requestor 114 and/or other devices by obtaining location information from one or more location servers, or the like, and compiling a list of the devices based upon that location information. It should be understood that this example is illustrative and therefore should not be construed as being limiting in any way.

Regardless of how the user device 102 discovers the devices in the proximity 112, the user device 102 can compile a list of the devices. It can be appreciated that the devices identified in operation 402 may or may not be enabled to collaborate in a collaboration session as illustrated and described herein. As such, the user device 102 can perform operations for identifying one or more of the devices that will collaborate in the collaboration session.

From operation 402, the method 400 proceeds to operation 404. At operation 404, the user device 102 can identify devices that will collaborate. In operation 404, the user device 102 can identify one or more devices (e.g., the collaborating device 110 shown in FIG. 1) from the devices identified in operation 402. As illustrated and described above with reference to FIG. 1A, the user device 102 can generate one or more invitations 120 and send the invitations 120 to the devices identified in operation 402.

In some embodiments, the invitation 120 can include a task description that can describe a task to be collaborated on by the devices, as well as an application query or other functionality to determine if the devices are enabled for the collaboration. In some embodiments, the devices may be determined to be enabled for the collaboration by determining that the devices have installed the task collaboration application 108 and/or similar functionality. It should be understood that this example is illustrative and therefore should not be construed as being limiting in any way.

In operation 404, the user device 102 can generate the invitations 120 and send the invitations 120 to the devices identified in operation 402. Operation 404 also can include obtaining one or more responses 122 from the devices to whom the invitations 120 were sent. The responses 122 can indicate if the devices will participate in the collaboration, decline to participate in the collaboration, and/or are not enabled to participate in the collaboration. Thus, in operation 404, the user device 102 can identify, via the responses 122, what devices will participate in the task collaboration.

From operation 404, the method 400 proceeds to operation 406. At operation 406, the user device 102 can create a group 118. As noted above, the user device 102 can determine that any device that is enabled for the task collaboration will be a member in the group 118. Thus, creating the group 118 can correspond to the user device 102 identifying the responses 122. From the perspective of the other members of the group 118, the group 118 may be created by receiving, from the user device 102, collaboration data 124 relating to the task. Thus, the group 118 may correspond to a logical collection of devices, in some embodiments. Because the group 118 can be created in additional and/or alternative manners, it should be understood that these examples are illustrative and therefore should not be construed as being limiting in any way.

From operation 406, the method 400 proceeds to operation 408. At operation 408, the user device 102 can specify a controller (also referred to herein as a "controller device"). In operation 408, the user device 102 can specify a device from the group 118 that will act as a controller device for the group during the task collaboration. It can be appreciated that the user device 102 can specify the controller device at other times such as when the trigger 116 is initially received. The illustrated embodiment assumes that the user device 102 identifies itself as the controller device, though this is not necessarily the case.

The controller device can be designated to communicate with the requestor 114 and/or devices in the group 118. The use of the controller device can be included to reduce communication between the requestor 114 and other devices and/or to provide a single device that will communicate with the requestor 114 to complete the task. The controller device can be specified, in some embodiments, based upon bandwidth, computing capabilities, and/or other performance ratings of devices in the group 118, by a user designation, and/or based upon other considerations such as proximity to the requestor 114, or the like. The controller device can orchestrate the task collaboration, provide the task data 130 to the requestor 114, and disband the group 118 after the task collaboration is completed.

From operation 408, the method 400 proceeds to operation 410. The method 400 ends at operation 410.

Figure 5:
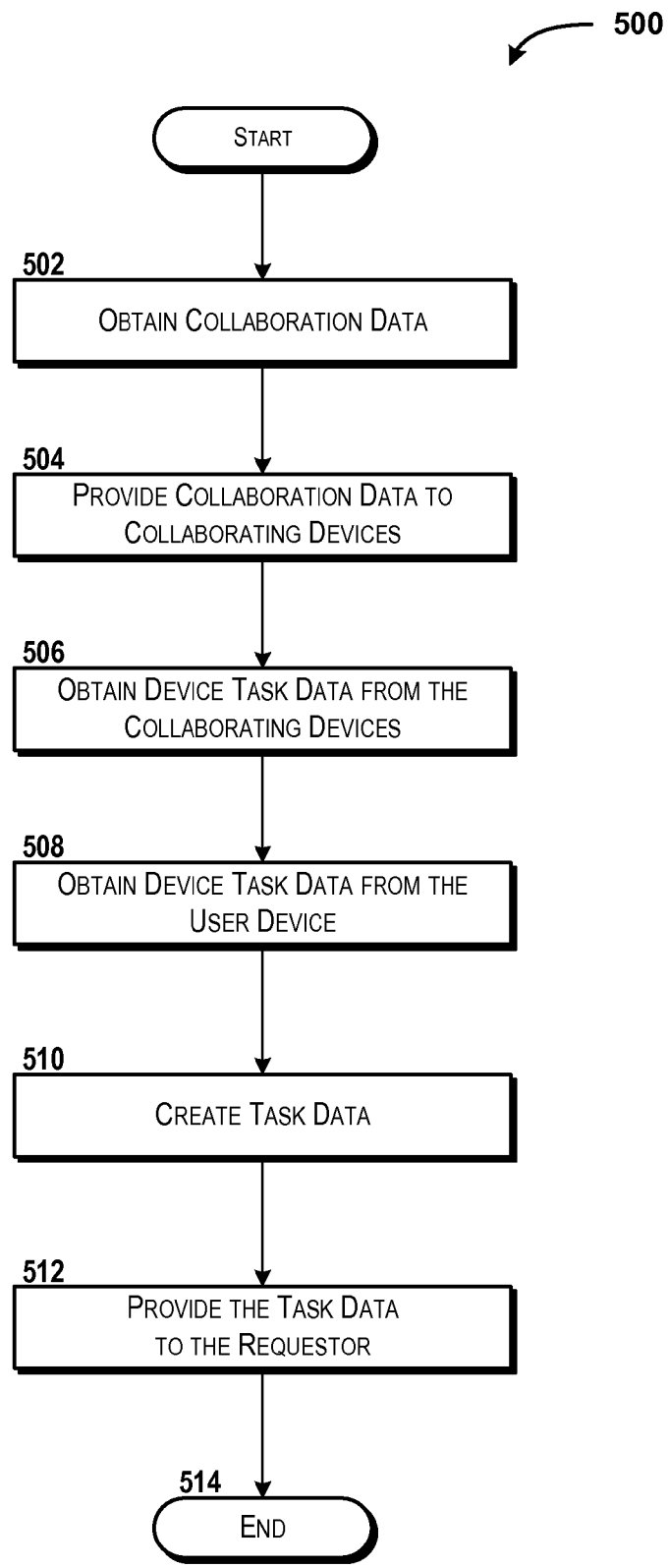
FIG. 5 is a flow diagram showing aspects of a method for directing completion of a task using a group of collaborating devices, according to an illustrative embodiment of the concepts and technologies described herein.

Turning now to FIG. 5, aspects of a method 500 for directing completion of a task using a group 118 of collaborating devices will be described in detail, according to an illustrative embodiment of the concepts and technologies described herein. It should be understood that the operations of the method 500 illustrated and described herein can be, but are not necessarily, performed by the user device 102 at operation 206 of the method 200 illustrated and described above with reference to FIG. 2. It should be understood that this example is illustrative and therefore should not be construed as being limiting in any way.

The method 500 begins at operation 502. At operation 502, the user device 102 can obtain the collaboration data 124. As explained herein, the collaboration data 124 can include, for example, data for defining user interface elements; data for inclusion in the user interface such as items, prices, tax rates, percentages, variables, parameters, or the like; images; video; instructions for the collaboration session; combinations thereof; or the like. The user device 102 can generate a request for the collaboration data 124 and submit the request to the requestor 114. Thus, although not shown in the FIGURES, the user device 102 can create a request for the collaboration data 124, provide the request to the requestor 114 or other entity, and receive the collaboration data 124 in response to the request.

In some other embodiments, the requestor 114 can provide the collaboration data 124 to the user device 102 without receiving a request. Thus, for example, the requestor 114 can detect creation of the group 118 and provide the collaboration data 124 to the user device 102 in response to detecting the creation of the group 118. Because the collaboration data 124 can be provided at other times and/or in other manners, it should be understood that these examples are illustrative and therefore should not be construed as being limiting in any way.

From operation 502, the method 500 proceeds to operation 504. At operation 504, the user device 102 can provide the collaboration data 124, or a portion thereof, to collaborating devices in the group 118 created in operation 406 of the method 400 illustrated and described with reference to FIG. 4. In some embodiments, the user device 102 can provide the same collaboration data 124 to each device in the group 118. In some other embodiments, the collaboration data 124 obtained by the user device 102 in operation 502 can be divided into two or more portions, with each portion being designated for one of the devices in the group 118. Thus, a task can be split up among devices in the group 118 by splitting the collaboration data 124. In some other embodiments, each device in the group 118 can perform a task based on a copy of the collaboration data 124 (e.g., in the food ordering example, each device can receive the menu and prices for generating an order associated with that device).

Thus, it can be appreciated that the user device 102 can be configured to divide the collaboration data 124 or replicate the collaboration data 124. In embodiments in which the collaboration data 124 is divided, the user device 102 can divide the collaboration data 124 into even portions or uneven portions. For purposes of illustrating and describing the concepts and technologies described herein, the collaboration data 124 is described as being replicated by the user device 102. It should be understood that this example is illustrative and therefore should not be construed as being limiting in any way.

From operation 504, the method 500 proceeds to operation 506. At operation 506, the user device 102 can obtain collaborating device task data 126. The collaborating device task data 126 can be obtained by a device in the group 118, for example the collaborating device 110. It can be appreciated that the user device 102 can obtain the collaborating device task data 126 from one or more collaborating devices 110.

As explained above, the collaborating device task data 126 can correspond to data output from the collaborating device 110 during completion of a portion of the task assigned to the collaborating device 110. Thus, in the case of a food order, the collaborating device task data 126 can include input (e.g., an order) and payment information that can be submitted by the collaborating device 110. Because other embodiments of collaboration are possible and are contemplated, it should be understood that this example is illustrative and therefore should not be construed as being limiting in any way.

From operation 506, the method 500 proceeds to operation 508. At operation 508, the user device 102 can obtain user device task data 128. Similar to the collaborating device task data 126, the user device 102 can complete a portion of a task and/or a device-specific iteration of the task (in embodiments where each device in the group 118 completes a similar task such as ordering food, providing personal information, registering for an event, or the like). The user device task data 128 therefore can correspond to input and payment information associated with the user device 102.

From operation 508, the method 500 proceeds to operation 510. At operation 510, the user device 102 can create task data 130. The user device 102 can obtain the user device task data 128 and the one or more instances of collaborating device task data 126 and combine the information into a package of data, though this is not necessarily the case. The various data collected by the user device 102 (as a package or otherwise) can be provided to the requestor 114 as the task data 130. In some embodiments, the user device 102 can add identification information to the task data 130 to identify a user or device associated with a portion of the task data 130. Thus, each device that submits device task data can be identified with a portion of the task data 130 to enable later identification of the device or user. Because this is not necessary in all embodiments, it should be understood that this example is illustrative and therefore should not be construed as being limiting in any way.

From operation 510, the method 500 proceeds to operation 512. At operation 512, the user device 102 can provide the task data 130 generated in operation 510 to the requestor 114. The user device 102 can transmit the task data 130 to the requestor 114 or make the task data 130 available to the requestor 114. In some embodiments, the user device 102 packages the task data 130 and submits the task data 130 to the requestor 114 as a single data transfer, while in some other embodiments the user device can transmit the task data 130 to the requestor 114 as multiple data transfers. It should be understood that these examples are illustrative and therefore should not be construed as being limiting in any way.

From operation 512, the method 500 proceeds to operation 514. The method 500 ends at operation 514.

Figure 6:
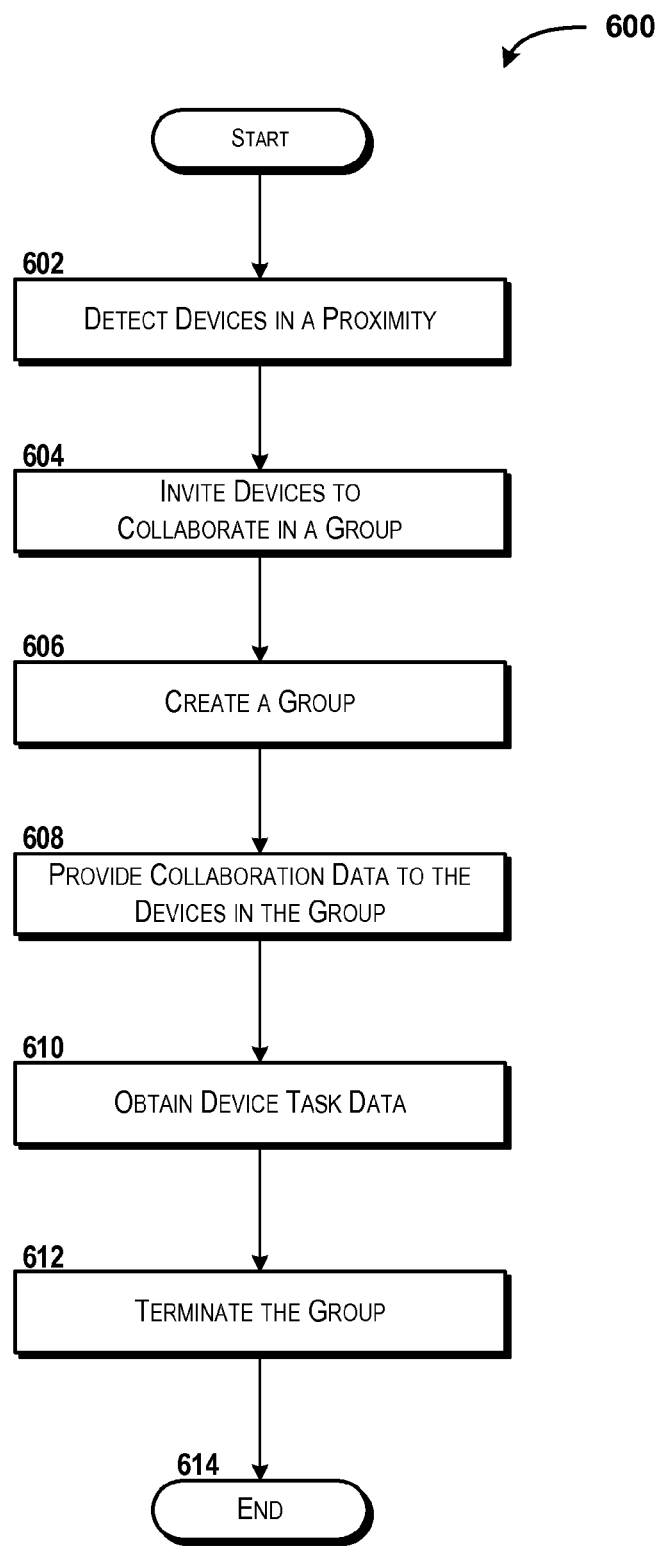
FIG. 6 is a flow diagram showing aspects of a method for creating and using a group of collaborating devices, according to another illustrative embodiment of the concepts and technologies described herein.

Turning now to FIG. 6, aspects of a method 600 for creating and using a group 118 of collaborating devices will be described in detail, according to an illustrative embodiment. The method 600 begins at operation 602. At operation 602, the requestor 114 can detect one or more devices such as the devices 134 in the proximity 112 of the requestor 114. It can be appreciated from the above description that the devices 134 can include one or more user devices such as the user device 102, one or more collaborating devices such as the collaborating device 110, and/or a combination thereof. The devices 134 can execute a task collaboration application 108 or other modules, software, applications, or other computer-executable code that can provide functionality such as that described herein with reference to the task collaboration application 108.

From operation 602, the method 600 proceeds to operation 604. At operation 604, the requestor 114 can invite one or more of the devices 134 to collaborate. The requestor 114 can generate and send one or more invitations 120 to the one or more devices 134 detected in operation 602. According to various embodiments, the invitations 120 can include a task description and an application query that can be used to determine if the devices 134 are enabled to support and/or participate in task collaboration. It should be understood that this example is illustrative and therefore should not be construed as being limiting in any way.

Operation 604 also can include receiving one or more responses 122 from the devices 134. The responses 122 can indicate whether the devices 134 accept the collaboration opportunity, decline the collaboration, and/or are not enabled to support collaboration. Because other types of responses 122 are possible and are contemplated, it should be understood that these examples are illustrative and therefore should not be construed as being limiting in any way.

From operation 604, the method 600 proceeds to operation 606. At operation 606, the requestor 114 can create a group 118. The devices 134 included in the group 118 created in operation 606 can be identified as those devices 134 that accept the invitations sent in operation 604. For example, the devices 134 can generate responses 122 such as the response 122 shown in FIG. 1A, and the requestor 114 can identify those devices 134 as members of the group 118. It should be understood that this example is illustrative and therefore should not be construed as being limiting in any way.

From operation 606, the method 600 proceeds to operation 608. At operation 608, the requestor 114 can provide collaboration data 124 to the devices 134 in the group 118. As explained above, the requestor 114 can divide the collaboration data 124 and provide a portion of the collaboration data 124 to each of the devices 134, in some embodiments. In some other embodiments, the requestor 114 can provide a copy of the collaboration data 124 to each of the devices 134.

From operation 608, the method 600 proceeds to operation 610. At operation 610, the requestor 114 can obtain device task data 136 from the devices 134 that are in the group 118 created in operation 606. As explained above, the device task data 136 can include input associated with the device 134, payment information (if included), and/or other information or data that can correspond to completion of the task or a portion thereof at the device 134. It should be understood that this example is illustrative and therefore should not be construed as being limiting in any way.

From operation 610, the method 600 proceeds to operation 612. In operation 612, the requestor 114 can disband the group 118 created in operation 606. As explained above, the requestor 114 can maintain information relating to the group 118, in some embodiments, or can provide information relating to the group 118 to the collaboration service 132 to enable the group 118 to be created again when the devices 134 return to the proximity 112 together. In some other embodiments, the group 118 created in operation 606 can be temporary and therefore can be permanently deleted after the task collaboration is complete.

From operation 612, the method 600 proceeds to operation 614. The method 600 ends at operation 614.

Figure 7A:
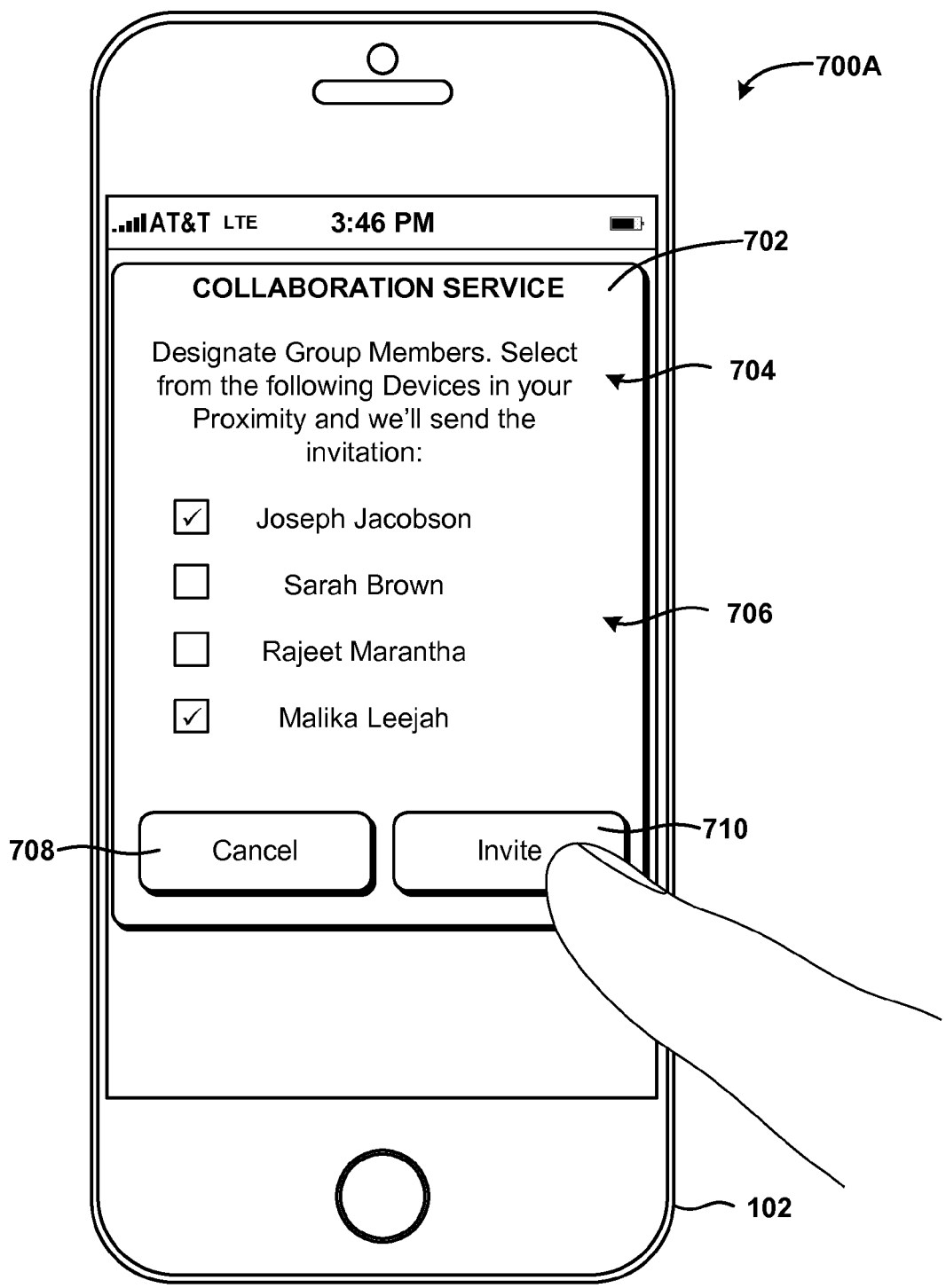
FIGS. 7A-7G are user interface diagrams showing various screen displays for creating and using groups for task collaboration, according to some illustrative embodiments of the concepts and technologies described herein.

FIGS. 7A-7G show aspects of UIs for interacting with, configuring, and/or providing functionality associated with a task collaboration application 108, according to some illustrative embodiments of the concepts and technologies described herein. FIG. 7A shows an illustrative screen display 700A generated by a device such as the user device 102. According to various embodiments, the user device 102 can generate the screen display 700A and/or other screen displays in conjunction with execution of the task collaboration application 108 and/or interactions with the requestor 114. It should be appreciated that the UI illustrated in FIG. 7A is illustrative of one contemplated example of UIs that can be generated by the user device 102 and therefore should not be construed as being limited in any way.

The screen display 700A can include various menus and/or menu options (not shown in FIG. 7A). The screen display 700A also can include a create group display 702. The create group display 702 can be viewed and/or interacted with by a user or other entity to view discovered devices (e.g., the collaborating device 110 and/or the devices 134) in the proximity 112 of the user device 102, to select users or devices to whom invitations 120 will be sent, and/or to perform other operations illustrated and described herein for creating a group 118. It should be understood that this example is illustrative and therefore should not be construed as being limiting in any way.

As shown in FIG. 7A, the create group display 702 can include a prompt 704. The prompt 704 can explain to a user or other entity that an opportunity for task collaboration exists. In the illustrated embodiment, the prompt 704 asks the user or other entity to select, from a list 706 of users or devices discovered in the proximity 112 of the user device 102, one or more users or devices that will be invited to join the group 118. While the illustrated list 706 depicts names associated with users, it should be understood that this example is illustrative. In particular, instead of usernames, device names, phone numbers, or other information could be displayed in the list 706. In one embodiment, the user device 102 can access a local or remote contact list and replace identifiers of devices or users with contact names, pictures, or the like. It should be understood that these examples are illustrative and therefore should not be construed as being limiting in any way.

The user or other entity can select one or more of the users or devices depicted in the list 706. If the user or entity does not select one or more of the users or devices, the user device 102 can determine that no group 118 is to be created. Additionally, or alternatively, the user or entity may select a UI control 708 that, when selected, informs the user device 102 and/or the task collaboration application 108 that no group 118 is to be created. Thus, the create group display 702 can present the UI control 708 to dismiss the create group display 702.

Additionally, or alternatively, the create group display 702 can include a UI control 710 to accept selections of users or devices from the list 706. It can be appreciated that selection of the UI control 710 can cause the user device 102 to generate and/or send the invitations 120 to the one or more users or devices selected via the create group display 702. Because additional and/or alternative UI controls can be included in the create group display 702, and because additional and/or alternative actions can be taken in response to selection of the UI controls 708, 710, it should be understood that these examples are illustrative and therefore should not be construed as being limiting in any way.

Figure 7B:
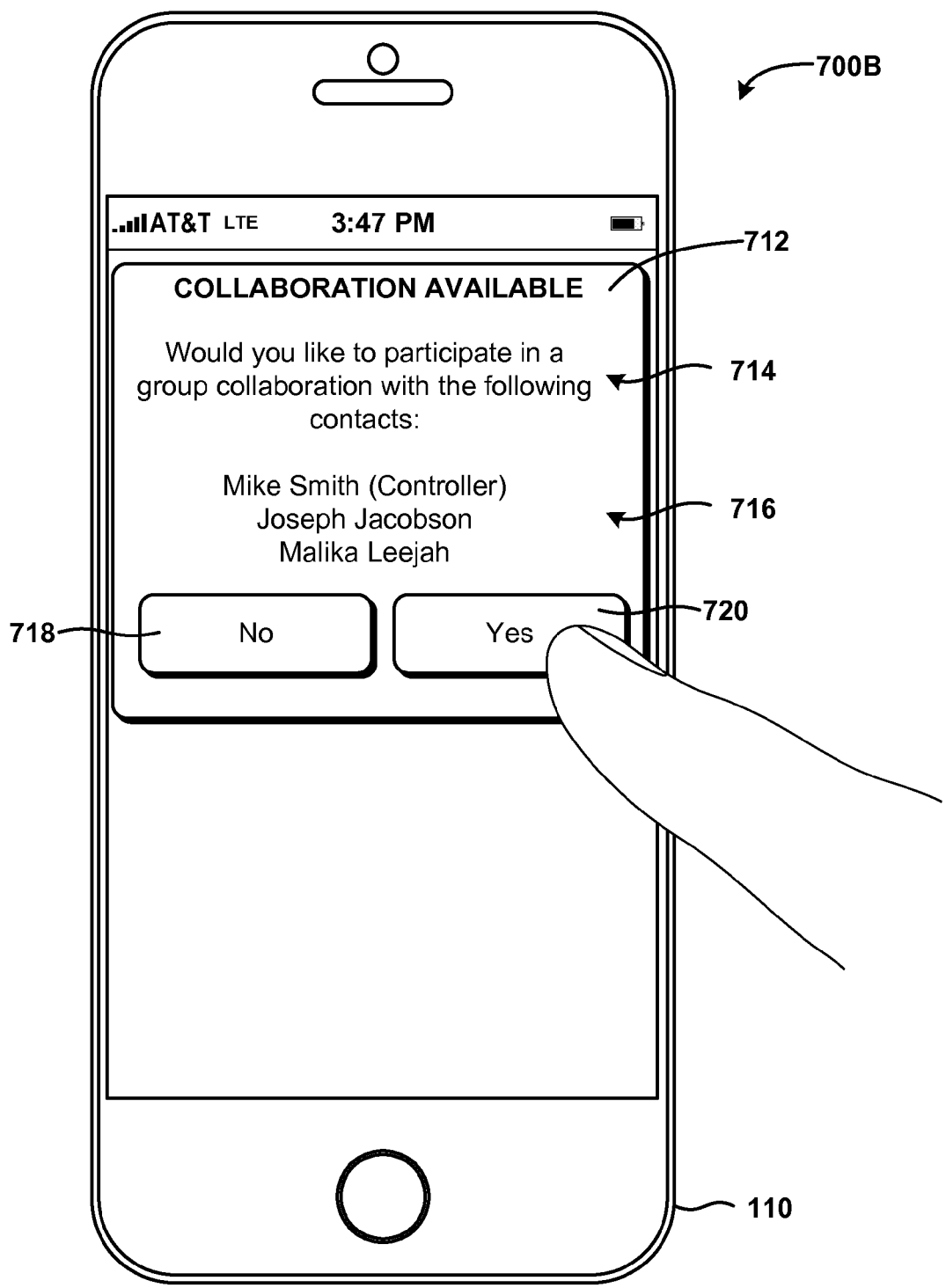

Referring now to FIG. 7B, additional aspects of the concepts and technologies disclosed herein for configuring and/or interacting with a task collaboration application 108 and/or a requestor 114 are described in detail. In particular, FIG. 7B shows an illustrative screen display 700B generated by a device such as the collaborating device 110. It should be appreciated that the UI diagram illustrated in FIG. 7B is illustrative of one contemplated example of a UI and therefore should not be construed as being limited in any way. As shown in FIG. 7B, the screen display 700B can be presented on a mobile computing device such as a smartphone, if desired. It should be understood that this example is illustrative, and should not be construed as being limiting in any way.

The screen display 700B can be displayed by the collaborating device 110, for example, in response to selection of the UI control 710 illustrated and described above with regard to FIG. 7A or another command to create the group 118 and/or to send invitations 120 to one or more users or devices as illustrated and described herein. Because the screen display 700B can be presented at additional and/or alternative times, it should be understood that this example is illustrative and therefore should not be construed as being limiting in any way.

In the screen display 700B shown in FIG. 7B, a collaboration invitation display 712 is illustrated. The collaboration invitation display 712 can include, in some embodiments, a caption 714. The caption 714 can provide an explanation of the collaboration to which the user or device is being invited and/or other information that may be included in and/or extracted from the invitation 120. The caption 714 also optionally can refer to a list of users or devices ("list") 716 with whom the collaboration can be completed.

In the illustrated embodiment, the list 716 includes three users or devices, which can be in addition to the collaborating device 110 and/or a user thereof, who can present or view the invitation 120 by way of presenting or viewing the collaboration invitation display 712. Of course, almost any number of collaborators can be included in a collaboration session. Generally, there will be two or more users or devices participating in a collaboration session, but various embodiments of the concepts and technologies described herein can involve almost any number of users or devices in the collaboration session and/or the group 118. It therefore should be understood that the illustrated list 716 is illustrative and should not be construed as being limiting in any way.

In the illustrated embodiment, the first name on the list 716, "Mike Smith," is indicated as being the controller (also referred to herein as the "controller device") for the task collaboration. As illustrated and described above, some embodiments of the task collaboration as illustrated and described herein can use one device as a controller. In some other embodiments, a controller may not be used, as illustrated and described above with reference to FIG. 1B and as will be illustrated and described in more detail below with reference to FIG. 7C. As such, the illustrated embodiment is illustrative of only some embodiments of the concepts and technologies described herein and therefore should not be construed as being limiting in any way.

The collaboration invitation display 712 also can include a UI control 718. The UI control 718 can be used to indicate that the user or device viewing or presenting the collaboration invitation display 712 declines participation in the collaboration session. Thus, selection of the UI control 718 can prompt the collaborating device 110 to send a response 122 to the requesting device (e.g., the user device 102) to indicate that collaboration is not desired or agreed to by the user or device. Because other actions can be taken in response to selection of the UI control 718, it should be understood that this example is illustrative and therefore should not be construed as being limiting in any way.

The collaboration invitation display 712 also can include a UI control 720. The UI control 720 can be used to indicate that the user or device viewing or presenting the collaboration invitation display 712 agrees to participate in the task collaboration or other collaboration session. Thus, selection of the UI control 720 can prompt the collaborating device 110 to send a response 122 to the requesting device (e.g., the user device 102) to indicate that the collaborating device 110 will participate in the collaboration and/or to initiate the collaboration. Because other actions can be taken in response to selection of the UI control 720, it should be understood that this example is illustrative and therefore should not be construed as being limiting in any way.

Figure 7C:
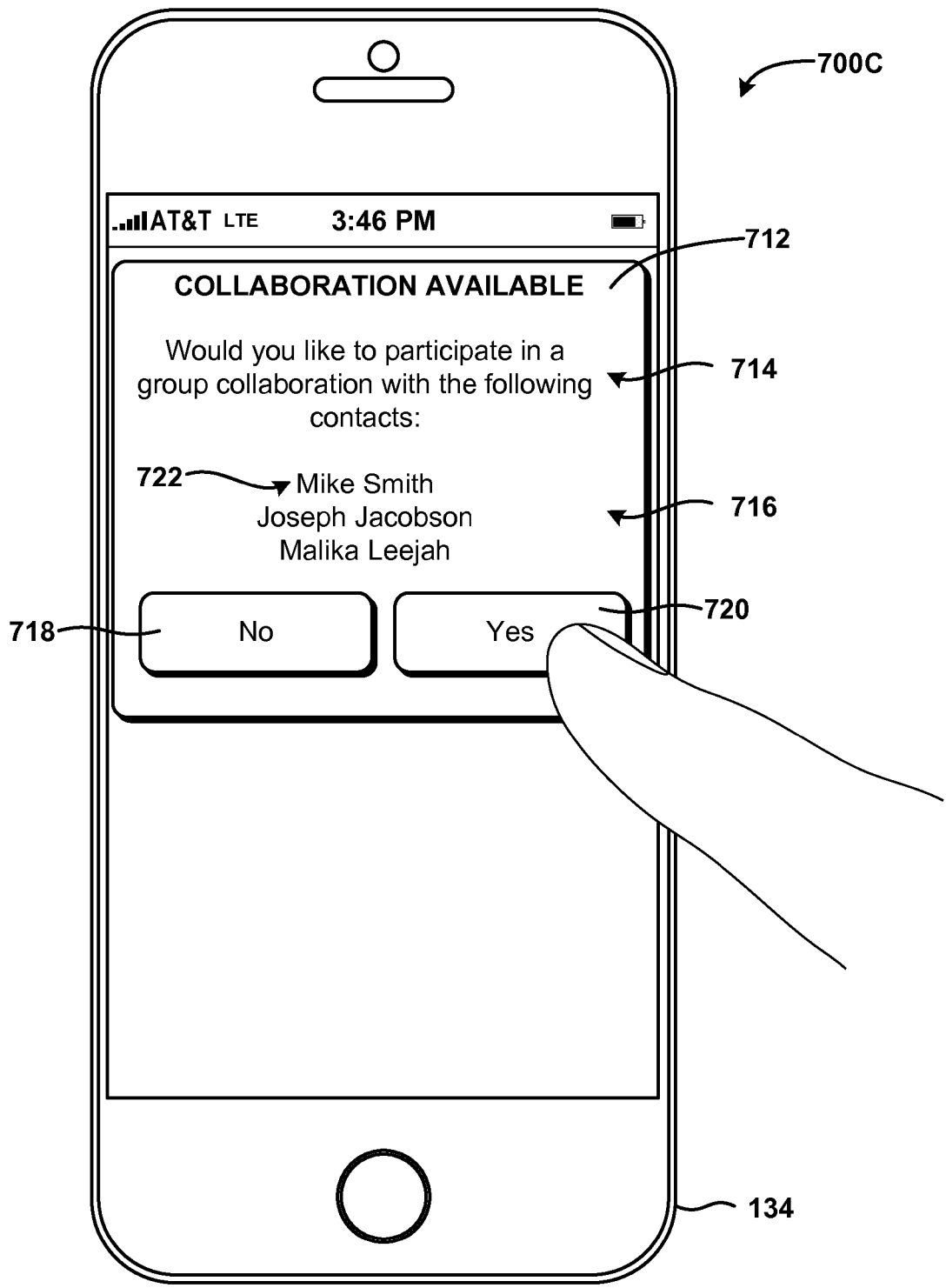

Turning now to FIG. 7C, additional aspects of the concepts and technologies disclosed herein for interacting with and/or providing functionality associated with a task collaboration application 108 and/or a requestor 114 are described in detail. In particular, FIG. 7C shows a screen display 700C that may be generated by and/or presented using a device such as one or more of the devices 134 via execution and/or interaction with a task collaboration application 108 and/or via interactions with a requestor 114. Because the screen display 700C can be shown at additional and/or alternative devices, it should be understood that this example is illustrative and therefore should not be construed as being limiting in any way.

The screen display 700C shown in FIG. 7C can be substantially similar to the screen display 700B illustrated and described above with reference to FIG. 7B. In particular, in FIG. 7C, the caption 714 and the list 716 are illustrated as being substantially similar to the caption 714 and list 716 shown in FIG. 7B. In FIG. 7C, however, the first name 722 in the list 716 is not labeled as a controller for the task collaboration. Rather, in FIG. 7C, all of the devices and/or users in the task collaboration can interact with a device such as the requestor 114 illustrated and described herein instead of a controller device.

Although not mentioned above with reference to FIG. 7B, it should be understood that the names in the list 716 can be populated, in some embodiments, by the collaborating device 110 and/or the device 134 based on information included in the invitation 120 and/or information stored at the collaborating device 110 and/or the device 134. In particular, in some embodiments, the invitation 120 can include Internet protocol ("IP") addresses, media access control ("MAC") addresses, phone numbers, international mobile subscriber identities ("IMSIs"), international mobile equipment identities ("IMEIs"), and/or other user or device identifiers, and the collaborating device 110 or device 134 can search local or remotely-stored contacts to populate the names in the list 716. Furthermore, as noted above, some embodiments of the concepts and technologies described herein can recognize devices with which an association exists (e.g., members of the same company, same account, same family, same plan, etc.). Although the user device 102 is not illustrated in FIGS. 7B-7C, it should be understood that this functionality can be part of the task collaboration application 108 and/or that the user device 102 can be configured to provide similar functionality in various embodiments.

The UI controls 718, 720 in FIG. 7C can be similar or even identical to the UI controls 718, 720 illustrated and described in FIG. 7B. Thus, selection of the UI control 718 can cause the device 134 to decline joining the collaboration session and/or send a response 122 indicating the unwillingness to join the task collaboration, while selection of the UI control 720 can cause the device 134 to join the collaboration session and/or send a response 122 indicating the willingness to join the task collaboration. It should be understood that this example is illustrative and therefore should not be construed as being limiting in any way.

Although not shown in FIGS. 7B-7C, some embodiments of the concepts and technologies described herein support a conditional acceptance or declination of the task collaboration. In particular, a user or other entity can specify one or more users or devices that, if joined to the collaboration or group 118, will result in the collaborating device 110 and/or the device 134 changing a response. Thus, in the example shown in FIG. 7C, a user or entity can conditionally accept collaboration and specify that if Mike Smith joins the collaboration, the user or entity declines collaboration. It should be understood that this example is illustrative and therefore should not be construed as being limiting in any way.

Figure 7D:
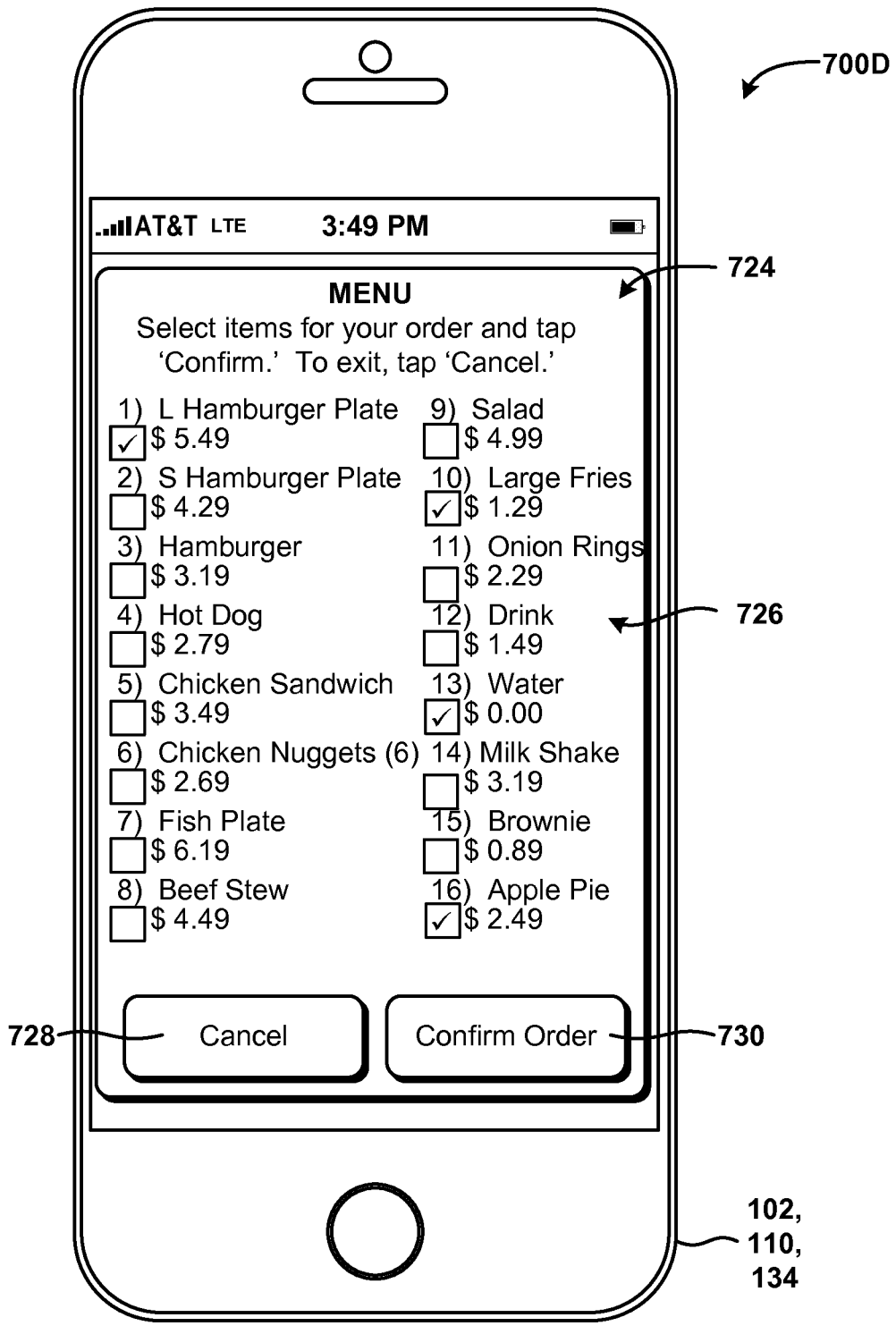

Referring now to FIG. 7D, additional aspects of the concepts and technologies disclosed herein for configuring and/or interacting with a task collaboration application 108 and/or a requestor 114 are described in detail. In particular, FIG. 7D shows an illustrative screen display 700D generated by a device such as the user device 102. From the above description of FIGS. 1A-7C, it can be appreciated that the screen display 700D can be displayed at one or more of the user device 102, the collaborating device 110, and/or the device 134. It should be appreciated that the UI diagram illustrated in FIG. 7D is illustrative of one contemplated example of a UI and therefore should not be construed as being limited in any way.

The screen display 700D can include a collaboration data display screen 724. The collaboration data display screen 724 can be displayed by the user device 102, for example, in response to the task collaboration application 108 executing at the user device 102 receiving collaboration data 124 from the requestor 114. It can be appreciated that if the screen display 700D is displayed at the collaborating device 110, the collaboration data 124 can be received or obtained instead from the user device 102. Because the collaboration data display screen 724 can be presented at additional and/or alternative times, it should be understood that this example is illustrative and therefore should not be construed as being limiting in any way.

As shown in FIG. 7D, the collaboration data display screen 724 can provide data associated with the collaboration to a user or other entity. In the illustrated example, the task collaboration can correspond to an ordering process at a restaurant. As such, the collaboration data 124 displayed in the screen display 700D can correspond to menu items and/or prices. It should be understood that this example is illustrative and therefore should not be construed as being limiting in any way.

In FIG. 7D, the collaboration data display screen 724 displays a menu 726. The menu 726 can include menu items, prices, and one or more checkboxes for selecting the items for purchase. Because other functionality for selecting menu items can be employed in the screen display 700D, it should be understood that this example is illustrative. Thus, a user or other entity can select the menu items he or she wants to purchase. Because other types of collaboration data 124 can be displayed on the screen display 700D, it should be understood that this example is illustrative and therefore should not be construed as being limiting in any way. In particular, task collaboration for providing personal information at a registration desk, obtaining tickets, paying for health services, or the like are contemplated and included in the scope of this disclosure.

The screen display 700D can include a UI control 728. Selection of the UI control 728 can cause the user device 102 to cancel the choices made, to cancel participation in the collaboration session, and/or can hide the collaboration data display screen 724. The screen display 700D also can include a UI control 730. Selection of the UI control 730 can cause the user device 102 to capture the choices made and/or to create device task data (e.g., the user device task data 128). Thus, the user device 102 can detect choices and prepare the device task data such as the user device task data 128 for submission to the requestor 114. Selection of the UI control 730 also can cause the user device 102 to display a confirmation screen, as will be illustrated and described in more detail with reference to FIG. 7E. Because other actions can be performed by the user device 102 in response to selection of the UI control 730, it should be understood that this example is illustrative and therefore should not be construed as being limiting in any way.

Figure 7E:
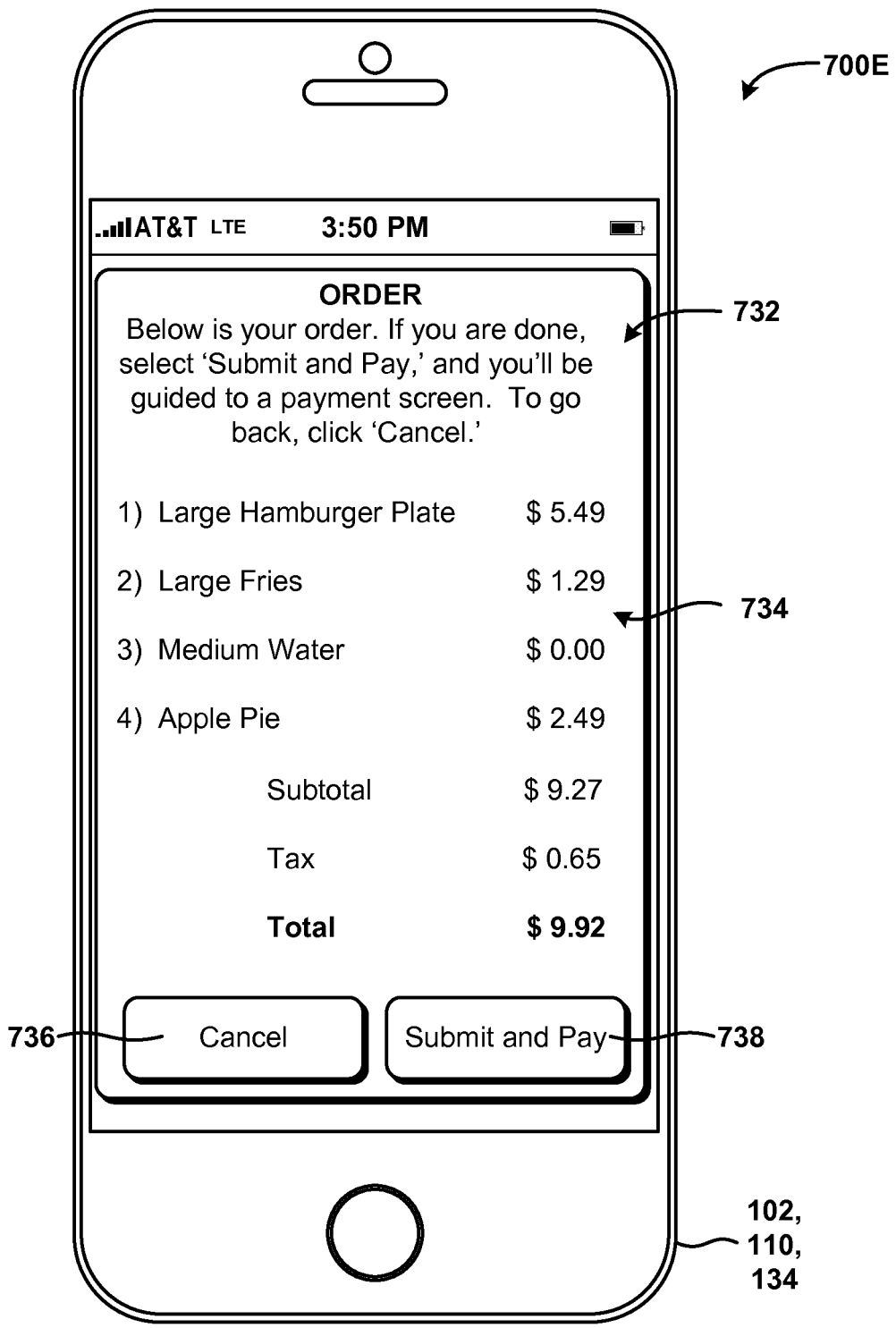

Referring now to FIG. 7E, additional aspects of the concepts and technologies disclosed herein for configuring and/or interacting with a task collaboration application 108 and/or a requestor 114 are described in detail. In particular, FIG. 7E shows an illustrative screen display 700E generated by a device such as the user device 102. From the above description of FIGS. 1A-7D, it can be appreciated that the screen display 700E can be displayed at one or more of the user device 102, the collaborating device 110, and/or the device 134. It should be appreciated that the UI diagram illustrated in FIG. 7E is illustrative of one contemplated example of a UI and therefore should not be construed as being limited in any way.

The screen display 700E can include a device task data submission window 732. The device task data submission window 732 can be displayed by the user device 102, for example, in response to the task collaboration application 108 executing at the user device 102 determining that data associated with the collaboration session is ready for submission. Thus, for example, the user device 102 can detect selection of the UI control 730 illustrated and described above with reference to FIG. 7D. Because the device task data submission window 732 can be presented at additional and/or alternative times, it should be understood that this example is illustrative and therefore should not be construed as being limiting in any way.

As shown in FIG. 7E, the device task data submission window 732 can provide a device task data summary 734. The device task data summary 734 can display the device task data (e.g., the user device task data 128, the collaborating device task data 126, and/or the device task data 136) that is to be submitted as part of the task collaboration. In the illustrated example, the task collaboration corresponds to a food ordering process, so the device task data summary 734 can present a user's food order. Because this example is merely illustrative of the concepts and technologies described herein, it should be understood that this example is illustrative and therefore should not be construed as being limiting in any way.

The screen display 700E can include a UI control 736. Selection of the UI control 736 can cause the user device 102 to cancel the submission of device task data (e.g., the user device task data 128) and/or to hide the device task data submission window 732. The screen display 700E also can include a UI control 738. Selection of the UI control 738 can cause the user device 102 to submit the device task data (e.g., the user device task data 128) to the requestor 114 and/or to take other operations such as combining the device task data with device task data from other devices (e.g., the collaborating device task data 126) and provide the task data 130 to the requestor 114, or the like.

Selection of the UI control 738 also can cause the user device 102 to display a payment screen. Thus, as mentioned above, multiple devices can collaborate and/or complete payment for various tasks or transactions during a task collaboration. Because other actions can be completed in response to selection of the UI control 738, it should be understood that the UI control 738 can be substituted for UI controls that prompt other actions by the user device 102. As such, the illustrated embodiment should not be construed as being limiting in any way.

Figure 7F:
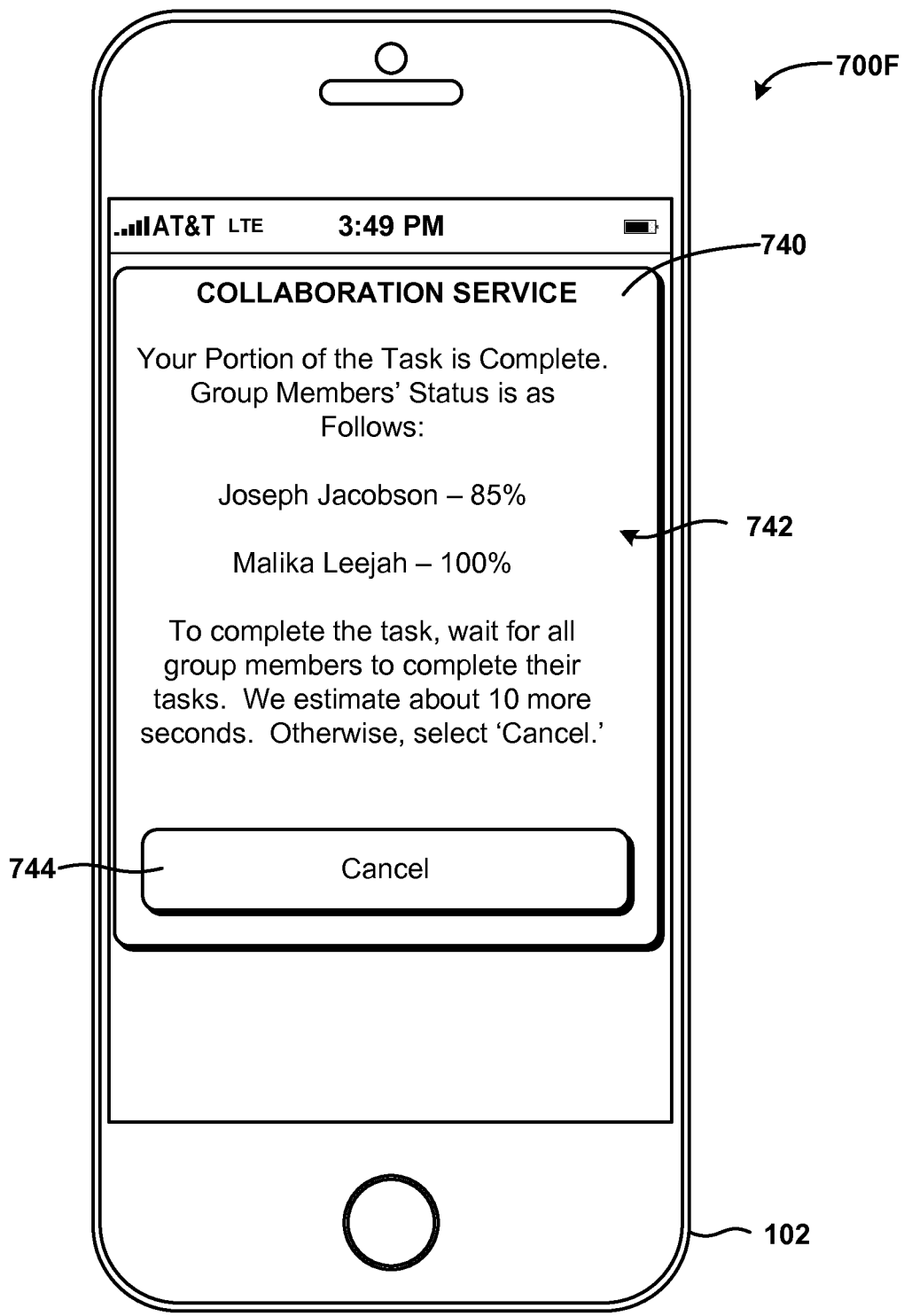

Referring now to FIG. 7F, additional aspects of the concepts and technologies disclosed herein for configuring and/or interacting with a task collaboration application 108 and/or a requestor 114 are described in detail. In particular, FIG. 7F shows an illustrative screen display 700F generated by a device such as the user device 102. From the above description of FIGS. 1A-7E, it can be appreciated that the screen display 700F can be displayed at one or more of the user device 102, the collaborating device 110, and/or the device 134. It should be appreciated that the UI diagram illustrated in FIG. 7F is illustrative of one contemplated example of a UI and therefore should not be construed as being limiting in any way.

The screen display 700F can include a collaboration session status window 740. The collaboration session status window 740 can be displayed by the user device 102, for example, in response to the task collaboration application 108 executing at the user device 102 detecting that the user device 102 has completed a portion of a task collaboration assigned to the user device 102. Furthermore, the user device 102 in the illustrated embodiment can serve as the controller, and as such, the user device 102 can be configured to track progress of other devices in the collaboration session. It should be understood that this example is illustrative and therefore should not be construed as being limiting in any way.

As shown in FIG. 7F, the collaboration session status window 740 can indicate to a user or other entity how other participants in the collaboration session are progressing with respect to their assigned tasks. In the illustrated embodiment, the collaboration session status window 740 includes a display 742 showing users or entities involved in the collaboration session and a percentage of completion of their respective tasks. In the example of purchasing food at a restaurant, the percentages can be determined by detecting activities at the devices, presentation of screens, transmission of data, or the like. In the case of the user "Malika Leejah," the user device 102 can determine that the user is one hundred percent completed in response to receiving the collaborating device task data 126 or other device task data from a device associated with that user. It should be understood that this example is illustrative and therefore should not be construed as being limiting in any way.

The screen display 700F can include a UI control 744. Selection of the UI control 744 can cause the user device 102 to terminate the collaboration session, in some embodiments. Thus, for example, if a user in the collaboration session ceases participation or elects not to proceed, a user or entity at the user device 102 can terminate the collaboration session. In some embodiments, the screen display 700F can include a UI control to drop a user or device from the collaboration session instead of terminating the entire session, though this UI control is not shown in FIG. 7F. Additionally, or alternatively, selection of the UI control 744 can prompt the user device 102 to create and submit the task data 130 based upon the information or data that has been received or obtained by the user device 102 at that point in time. Thus, it can be appreciated that selection of the UI control 744 can prompt the user device 102 to hide the collaboration session status window 740, to terminate the collaboration session, to complete the collaboration, and/or to take other actions. It should be understood that this example is illustrative and therefore should not be construed as being limiting in any way.

Figure 7G:
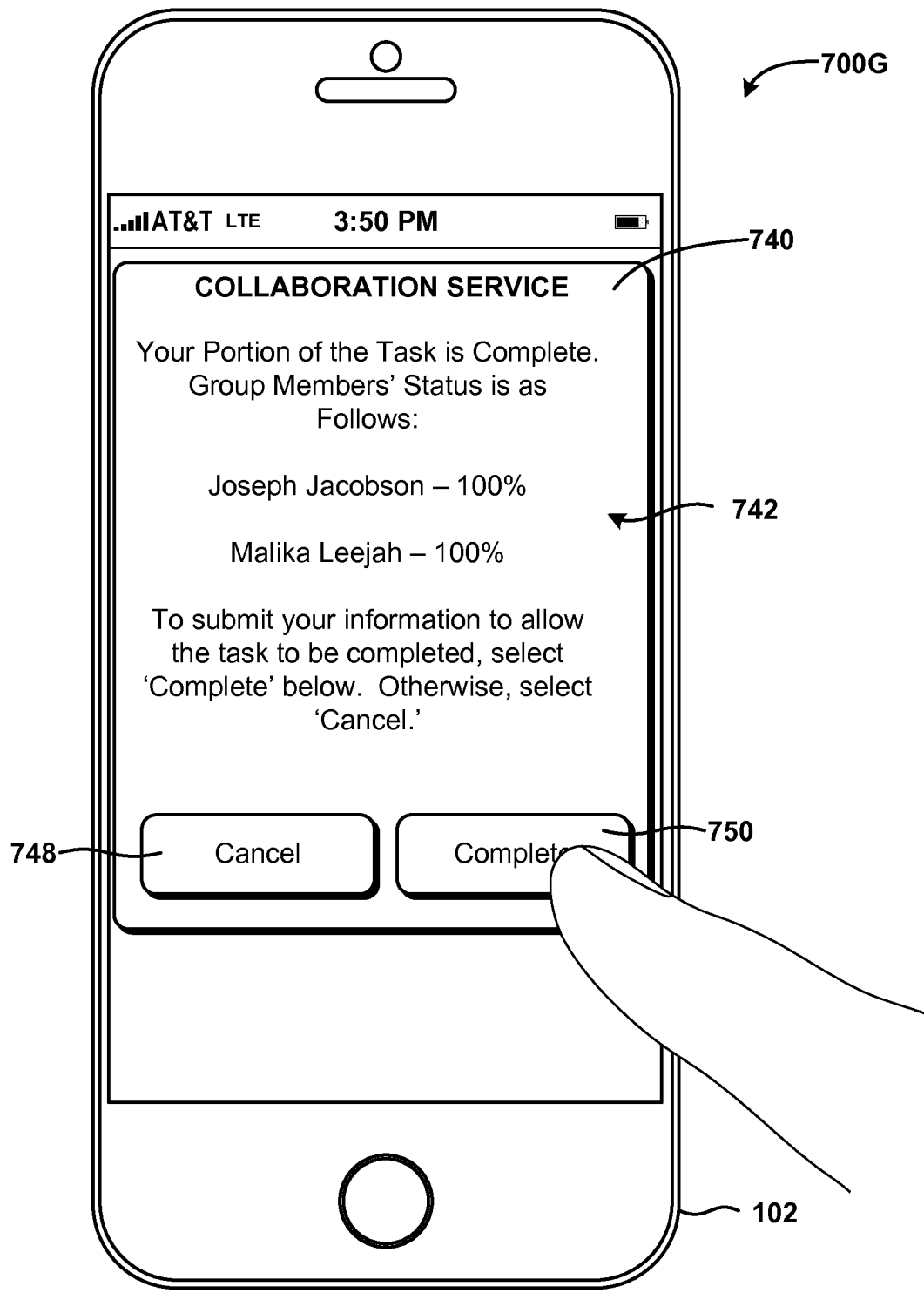

Referring now to FIG. 7G, additional aspects of the concepts and technologies disclosed herein for configuring and/or interacting with a task collaboration application 108 and/or a requestor 114 are described in detail. In particular, FIG. 7G shows an illustrative screen display 700G generated by a device such as the user device 102. From the above description of FIGS. 1A-7F, it can be appreciated that the screen display 700G can be displayed at one or more of the user device 102, the collaborating device 110, and/or the device 134. It should be appreciated that the UI diagram illustrated in FIG. 7G is illustrative of one contemplated example of a UI and therefore should not be construed as being limiting in any way.

The screen display 700G shows the collaboration session status window 740 shown in FIG. 7F, but the collaboration session status window 740 has been updated to indicate that all of the collaborating users have completed their portions of the collaboration session. It should be understood that in some embodiments, the collaboration session status window 740 is not presented, and the user device 102 can handle the collaboration session in the background and/or at least not expose information to the user. It should be understood that this example is illustrative and therefore should not be construed as being limiting in any way.

The screen display 700G can include a UI control 748. The UI control 748 can be substantially similar or even identical to the UI control 744 illustrated and described above with reference to FIG. 7F. Thus, selection of the UI control 748 can terminate the collaboration session, drop users from the collaboration session, or cause the user device 102 to take additional and/or alternative actions. The screen display 700G also can present a UI control 750. The UI control 750 can prompt the user device 102 to create and submit the task data 130 to the requestor. Thus, selection of the UI control 750 can cause the user device 102 to use the device task data (e.g., the user device task data 128, the collaborating device task data 126, and/or the device task data 136) to create the task data 130, and to submit the task data 130 to the requestor 114 or other entity. As noted above, the creation and/or submission of the task data 130 can occur without user interaction at the user device 102, and as such the illustrated embodiment should not be construed as being limiting in any way.

Figure 8:
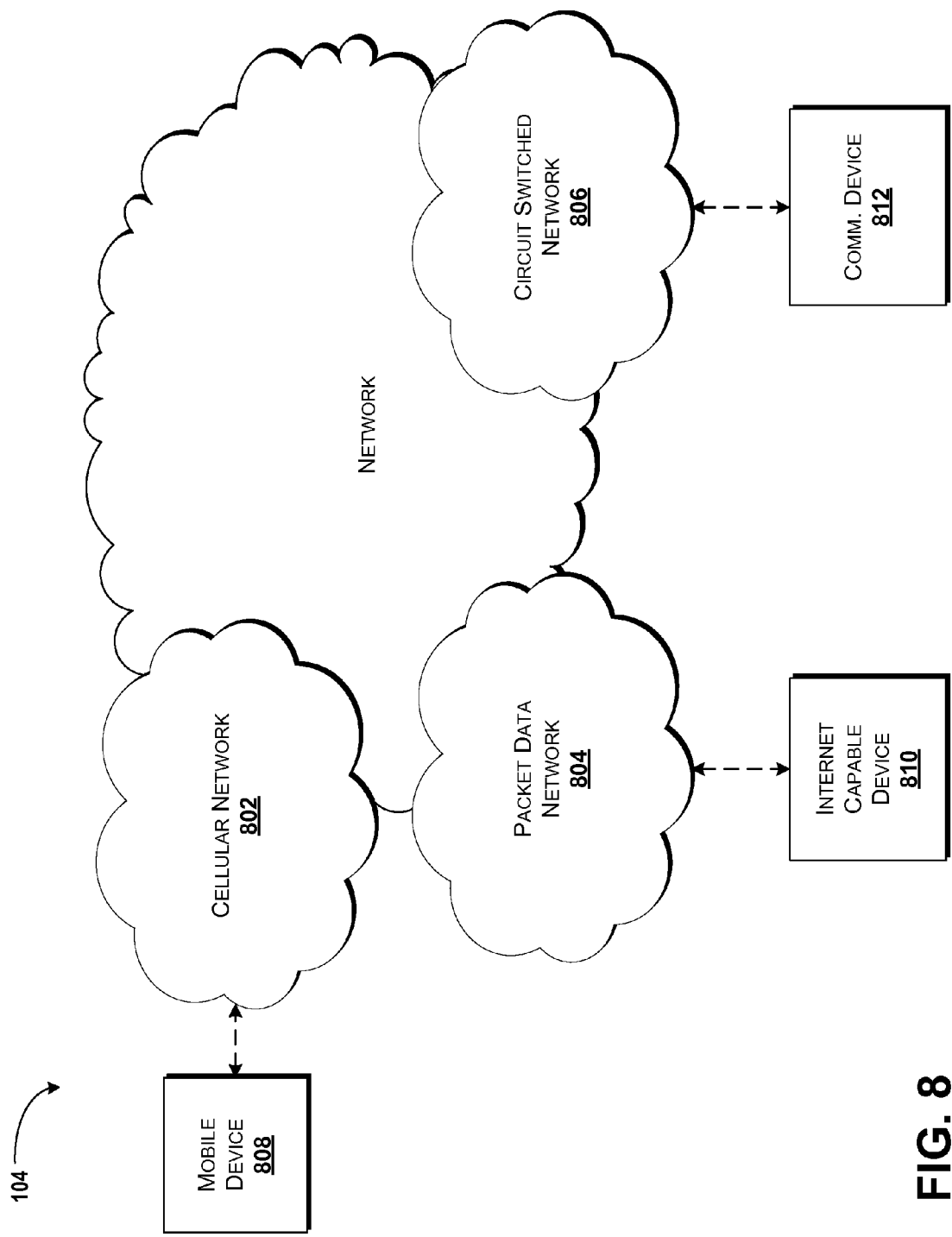
FIG. 8 schematically illustrates a network, according to an illustrative embodiment of the concepts and technologies described herein.

Turning now to FIG. 8, additional details of the network 104 are illustrated, according to an illustrative embodiment. The network 104 includes a cellular network 802, a packet data network 804, for example, the Internet, and a circuit switched network 806, for example, a publicly switched telephone network ("PSTN"). The cellular network 802 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 802 also includes radios and nodes for receiving and transmitting voice, data, and combinations thereof to and from radio transceivers, networks, the packet data network 804, and the circuit switched network 806.

A mobile communications device 808, such as, for example, a cellular telephone, a user equipment, a mobile terminal, a PDA, a laptop computer, a handheld computer, and combinations thereof, can be operatively connected to the cellular network 802. The cellular network 802 can be configured as a 2G GSM network and can provide data communications via GPRS and/or EDGE. Additionally, or alternatively, the cellular network 802 can be configured as a 3G UMTS network and can provide data communications via the HSPA protocol family, for example, HSDPA, EUL (also referred to as HSUPA), and HSPA+. The cellular network 802 also is compatible with 4G mobile communications standards as well as evolved and future mobile standards.

The packet data network 804 includes various devices, for example, servers, computers, databases, and other devices in communication with one another, as is generally known. The packet data network 804 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 804 includes or is in communication with the Internet. The circuit switched network 806 includes various hardware and software for providing circuit switched communications. The circuit switched network 806 may include, or may be, what is often referred to as a plain old telephone system (POTS). The functionality of a circuit switched network 806 or other circuit-switched network are generally known and will not be described herein in detail.

The illustrated cellular network 802 is shown in communication with the packet data network 804 and a circuit switched network 806, though it should be appreciated that this is not necessarily the case. One or more Internet-capable devices 810, for example, a PC, a laptop, a portable device, or another suitable device, can communicate with one or more cellular networks 802, and devices connected thereto, through the packet data network 804. It also should be appreciated that the Internet-capable device 810 can communicate with the packet data network 804 through the circuit switched network 806, the cellular network 802, and/or via other networks (not illustrated).

As illustrated, a communications device 812, for example, a telephone, facsimile machine, modem, computer, or the like, can be in communication with the circuit switched network 806, and therethrough to the packet data network 804 and/or the cellular network 802. It should be appreciated that the communications device 812 can be an Internet-capable device, and can be substantially similar to the Internet-capable device 810. In the specification, the network 104 is used to refer broadly to any combination of the networks 802, 804, 806. It should be appreciated that substantially all of the functionality described with reference to the network 104 can be performed by the cellular network 802, the packet data network 804, and/or the circuit switched network 806, alone or in combination with other networks, network elements, and the like.

Figure 9:
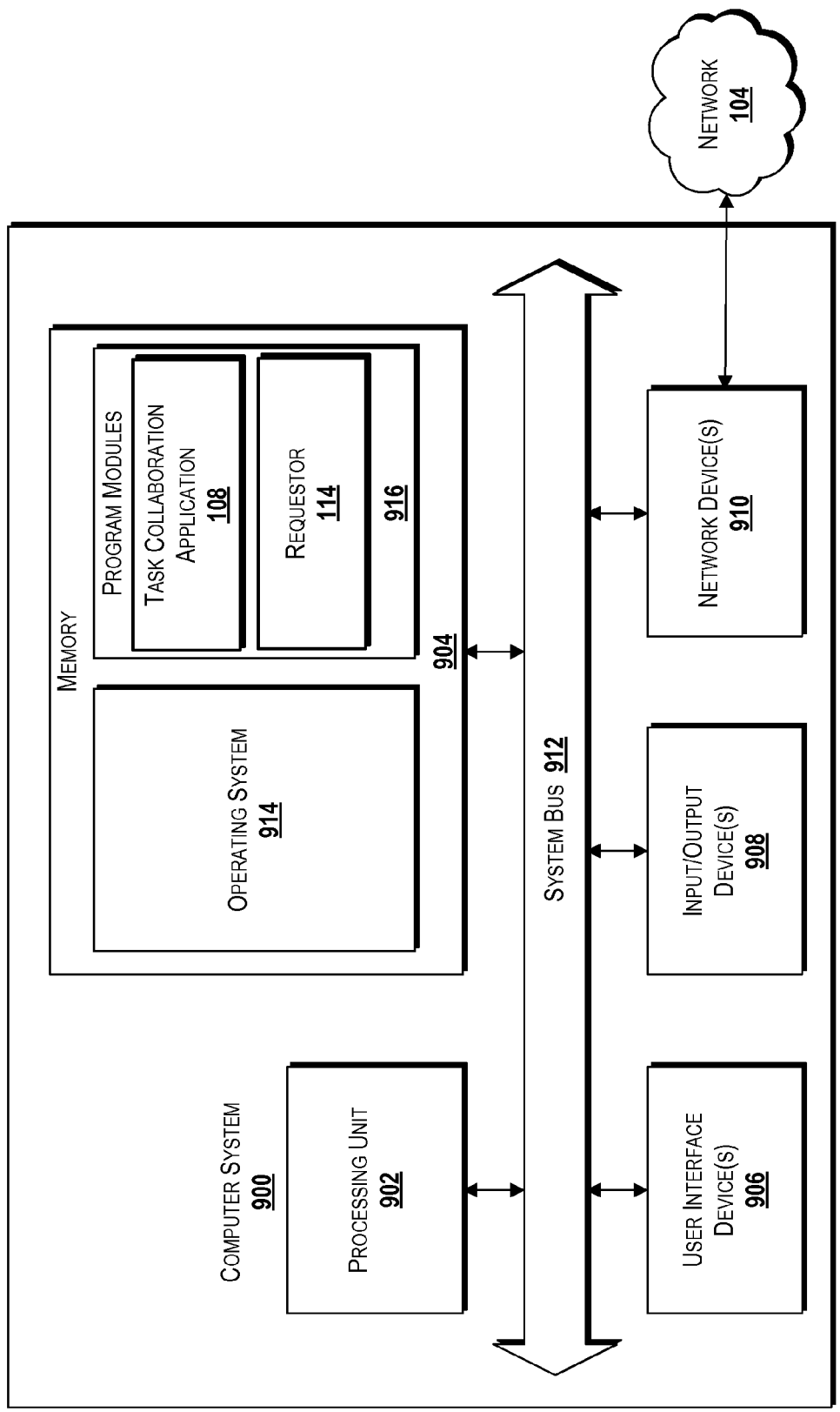
FIG. 9 is a block diagram illustrating an example computer system configured to create and use groups for task collaboration, according to some illustrative embodiments of the concepts and technologies described herein.

FIG. 9 is a block diagram illustrating a computer system 900 configured to provide the functionality described herein for creating and using groups for task collaboration, in accordance with various embodiments of the concepts and technologies disclosed herein. The computer system 900 includes a processing unit 902, a memory 904, one or more user interface devices 906, one or more input/output ("I/O") devices 908, and one or more network devices 910, each of which is operatively connected to a system bus 912. The bus 912 enables bi-directional communication between the processing unit 902, the memory 904, the user interface devices 906, the I/O devices 908, and the network devices 910.

The processing unit 902 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 904 communicates with the processing unit 902 via the system bus 912. In some embodiments, the memory 904 is operatively connected to a memory controller (not shown) that enables communication with the processing unit 902 via the system bus 912. The memory 904 includes an operating system 914 and one or more program modules 916. The operating system 914 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 916 may include various software and/or program modules described herein. In some embodiments, for example, the program modules 916 include the task collaboration application 108 and/or computer code for providing the functionality associated with the requestor 114. These and/or other programs can be embodied in computer-readable media containing instructions that, when executed by the processing unit 902, perform one or more of the methods 200, 300, 400, 500, 600 described in detail above with respect to FIGS. 2-6. According to embodiments, the program modules 916 may be embodied in hardware, software, firmware, or any combination thereof. Although not shown in FIG. 9, it should be understood that the memory 904 also can be configured to store the trigger 116, the invitation 120, the response 122, the collaboration data 124, the collaborating device task data 126, the user device task data 128, the task data 130, group information, device task data 136, and/or other data, if desired.

By way of example, and not limitation, computer-readable media may include any available computer storage media or communication media that can be accessed by the computer system 900. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 900. In the claims, the phrase "computer storage medium" and variations thereof does not include waves or signals per se and/or communication media.

The user interface devices 906 may include one or more devices with which a user accesses the computer system 900. The user interface devices 906 may include, but are not limited to, computers, servers, personal digital assistants, cellular phones, or any suitable computing devices. The I/O devices 908 enable a user to interface with the program modules 916. In one embodiment, the I/O devices 908 are operatively connected to an I/O controller (not shown) that enables communication with the processing unit 902 via the system bus 912. The I/O devices 908 may include one or more input devices, such as, but not limited to, a keyboard, a mouse, or an electronic stylus. Further, the I/O devices 908 may include one or more output devices, such as, but not limited to, a display screen or a printer.

The network devices 910 enable the computer system 900 to communicate with other networks or remote systems via a network, such as the network 104. Examples of the network devices 910 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 10:
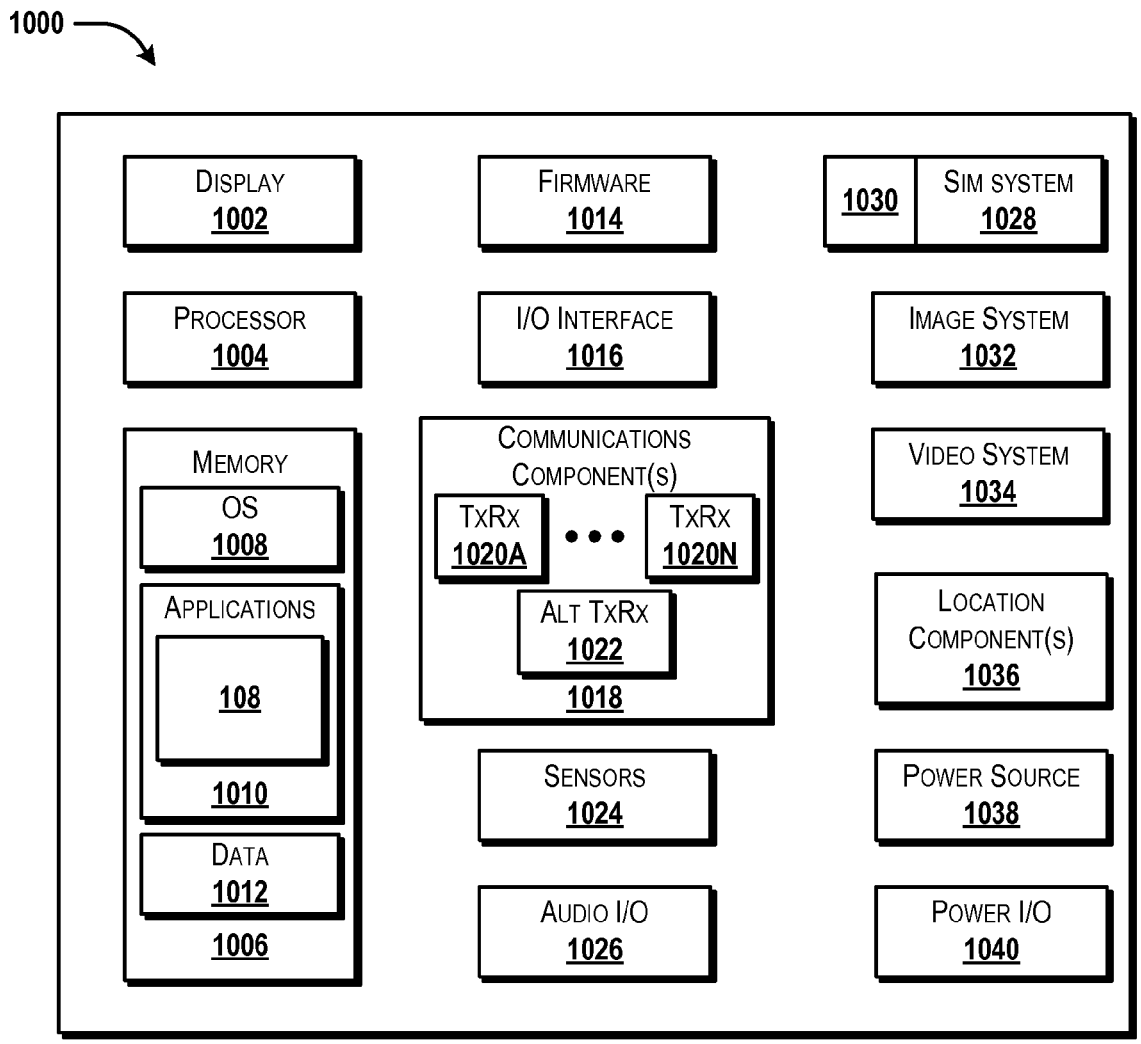
FIG. 10 is a block diagram illustrating an example mobile device configured to collaborate with other devices to perform a task, according to some illustrative embodiments of the concepts and technologies described herein.

Turning now to FIG. 10, an illustrative mobile device 1000 and components thereof will be described. In some embodiments, the user device 102, the collaborating device 110, the requestor 114, and/or the devices 134 described above with reference to FIGS. 1A-9 can be configured as and/or can have an architecture similar or identical to the mobile device 1000 described herein in FIG. 10. It should be understood, however, that the user device 102, the collaborating device 110, the requestor 114, and/or the devices 134 may or may not include the functionality described herein with reference to FIG. 10. While connections are not shown between the various components illustrated in FIG. 10, it should be understood that some, none, or all of the components illustrated in FIG. 10 can be configured to interact with one other to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various graphical user interface ("GUI") elements for presenting invitations 120, creating or transmitting responses 122, viewing collaboration data 124, creating and/or transmitting device task data (e.g., the collaborating device task data 126, the user device task data 128, and/or the device task data 136), and/or submitting task data 130, text, images, video, virtual keypads and/or keyboards, messaging data, notification messages, metadata, internet content, device status, time, date, calendar data, device preferences, map and location data, combinations thereof, and/or the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008, one or more applications 1010 such as the task collaboration application 108, other computer-executable instructions stored in a memory 1006, or the like. In some embodiments, the applications 1010 also can include a UI application (not illustrated in FIG. 10).

The UI application can interface with the operating system 1008, such as the operating system 106 shown in FIG. 1A, to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering content, generating the various user interfaces described herein, configuring settings, manipulating address book content and/or settings, multimode interaction, interacting with other applications 1010, and otherwise facilitating user interaction with the operating system 1008, the applications 1010, and/or other types or instances of data 1012 that can be stored at the mobile device 1000. The data 1012 can include, for example, the trigger 116, the invitation 120, the response 122, the collaboration data 124, the collaborating device task data 126, the user device task data 128, the task data 130, the device task data 136, and/or other applications or program modules. According to various embodiments, the data 1012 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 1016. The I/O interface 1016 can be configured to support the input/output of data such as location information, triggers 116, invitations 120, responses 122, device task data (e.g., the user device task data 128, the collaborating device task data 126, the device task data 136), user information, organization information, presence status information, user IDs, passwords, and application initiation (start-up) requests. In some embodiments, the I/O interface 1016 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like.

In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks such as the network 104 described herein. In some embodiments, other networks include networks that utilize non-cellular wireless technologies such as WI-FI or WIMAX. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments one or more of the transceivers of the communications component 1018 may be configured to communicate using GSM, CDMAONE, CDMA2000, LTE, and various other 2G, 2.5G, 3G, 4G, and greater generation technology standards. Moreover, the communications component 1018 may facilitate communications over various channel access methods (which may or may not be used by the aforementioned standards) including, but not limited to, TDMA, FDMA, W-CDMA, OFDM, SDMA, and the like.

In addition, the communications component 1018 may facilitate data communications using GPRS, EDGE, the HSPA protocol family including HSDPA, EUL or otherwise termed HSUPA, HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an $N^{th}$ transceiver ("TxRx") 1020N that can operate in a second communications mode relative to the first transceiver 1020A (e.g., UMTS). While two transceivers 1020A-N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, orientation sensors, noise sensors, proximity sensors, or the like. As such, it should be understood that the sensors 1024 can include, but are not limited to, accelerometers, magnetometers, gyroscopes, infrared sensors, noise sensors, microphones, combinations thereof, or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another mobile device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted-GPS ("A-GPS") devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

Based on the foregoing, it should be appreciated that systems and methods for creating and using groups for task collaboration have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

I claim:

1. A method comprising:
    initiating, by a computing device comprising a processor, collaboration on a task by a group of devices, wherein the group of devices comprises the computing device and a collaborating device that is associated with a first user, wherein the computing device is associated with a second user, and wherein the task comprises a first portion of the task and a second portion of the task;
    providing, by the computing device, a portion of collaboration data to the collaborating device, wherein the portion of collaboration data relates to the first user and to the first portion of the task;
    obtaining, by the computing device, input generated by the collaborating device, the input being generated at the collaborating device based on the portion of collaboration data, wherein the input comprises payment information associated with a first payment account;
    obtaining, by the computing device, further input generated by the computing device, wherein the further input relates to the second user and to the second portion of the task, wherein the further input comprises payment information associated with a second payment account; and
    providing, by the computing device, the input and the further input to a requestor device.

2. The method of claim 1, further comprising determining that an opportunity exists to collaborate in response to receiving a trigger to initiate a collaboration session.

3. The method of claim 1, further comprising:
    generating task data comprising the input and the further input; and
    providing the task data to the requestor device.

4. The method of claim 1, further comprising:
    discovering the collaborating device;
    directing an invitation to the collaborating device, the invitation comprising data identifying the task; and
    receiving a response to the invitation, the response indicating that the collaborating device will collaborate.

5. The method of claim 4, further comprising determining that an opportunity exists to collaborate in response to receiving a trigger comprising the data identifying the task.

6. A system comprising:
    a processor; and
    a memory that stores computer-executable instructions that, when executed by the processor, cause the processor to perform operations comprising
        initiating collaboration on a task by a group of devices, wherein the group of devices comprises a computing device and a collaborating device that is associated with a first user, wherein the computing device is associated with a second user, and wherein the task comprises a first portion of the task and a second portion of the task,
        providing a portion of collaboration data to the collaborating device, wherein the portion of collaboration data relates to the first user and to the first portion of the task,
        obtaining input generated by the collaborating device, the input being generated at the collaborating device based on the portion of collaboration data, wherein the input comprises payment information associated with a first payment account,
        obtaining further input generated by the computing device, wherein the further input relates to the second user and to the second portion of the task, wherein the further input comprises payment information associated with a second payment account, and
        providing the input and the further input to a requestor device.

7. The system of claim 6, wherein the instructions, when executed by the processor, cause the processor to perform operations further comprising:
    discovering the collaborating device;
    determining that the computing device and the collaborating device will collaborate; and
    creating the group.

8. A computer storage medium having computer-executable instructions stored thereon that, when executed by a processor, cause the processor to perform operations comprising:
    initiating collaboration on a task by a group of devices, wherein the group of devices comprises a computing device and a collaborating device that is associated with a first user, wherein the computing device is associated with a second user, and wherein the task comprises a first portion of the task and a second portion of the task;
    providing a portion of collaboration data to the collaborating device, wherein the portion of collaboration data relates to the first user and to the first portion of the task;
    obtaining input generated by the collaborating device, the input being generated at the collaborating device based on the portion of collaboration data, wherein the input comprises payment information associated with a first payment account;
obtaining further input generated by the computing device, wherein the further input relates to the second user and to the second portion of the task, wherein the further input comprises payment information associated with a second payment account; and
providing the input and the further input to a requestor device.

9. The computer storage medium of claim 8, wherein the instructions, when executed by the processor, cause the processor to perform operations further comprising:
discovering the collaborating device;
determining that the collaborating device will collaborate; and
creating the group.

10. The method of claim 1, wherein the further input is based on a further portion of collaboration data.

11. The method of claim 1, further comprising ceasing participation in the group in response to detecting completion of the task.

12. The method of claim 2, further comprising specifying a controller for the collaboration session.

13. The system of claim 6, wherein the instructions, when executed by the processor, cause the processor to perform operations further comprising:
determining that an opportunity exists to collaborate in response to receiving a trigger to initiate a collaboration session.

14. The system of claim 6, wherein the instructions, when executed by the processor, cause the processor to perform operations further comprising:
generating task data comprising the input and the further input; and
providing the task data to the requestor device.

15. The system of claim 6, wherein the instructions, when executed by the processor, cause the processor to perform operations further comprising:
discovering the collaborating device;
directing an invitation to the collaborating device, the invitation comprising data identifying the task; and
receiving a response to the invitation, the response indicating that the collaborating device will collaborate.

16. The computer storage medium of claim 8, wherein the instructions, when executed by the processor, cause the processor to perform operations further comprising:
determining that an opportunity exists to collaborate in response to receiving a trigger to initiate a collaboration session.

17. The computer storage medium of claim 8, wherein the instructions, when executed by the processor, cause the processor to perform operations further comprising:
generating task data comprising the input and the further input; and
providing the task data to the requestor device.

18. The computer storage medium of claim 8, wherein the instructions, when executed by the processor, cause the processor to perform operations further comprising:
discovering the collaborating device;
directing an invitation to the collaborating device, the invitation comprising data identifying the task; and
receiving a response to the invitation, the response indicating that the collaborating device will collaborate.

* * * * *